United States Patent
Seyama

(10) Patent No.: US 9,049,719 B2
(45) Date of Patent: Jun. 2, 2015

(54) COMMUNICATION SYSTEM, TRANSMITTING STATION, AND MOBILE STATION, FOR DETERMINING ALLOCATION OF FREQUENCY BAND USED IN COMMUNICATION

(75) Inventor: Takashi Seyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 177 days.

(21) Appl. No.: 13/324,725

(22) Filed: Dec. 13, 2011

(65) Prior Publication Data

US 2012/0082055 A1 Apr. 5, 2012

Related U.S. Application Data

(63) Continuation of application No. PCT/JP2009/061346, filed on Jun. 22, 2009.

(51) Int. Cl.
| | |
|---|---|
| *H04L 1/00* | (2006.01) |
| *H04L 12/26* | (2006.01) |
| *H04W 72/04* | (2009.01) |
| *H04W 24/00* | (2009.01) |
| *H04W 72/08* | (2009.01) |

(52) U.S. Cl.
CPC .......... *H04W 72/0453* (2013.01); *H04W 24/00* (2013.01); *H04W 72/08* (2013.01); *H04W 72/046* (2013.01); *H04W 72/085* (2013.01)

(58) Field of Classification Search
CPC .... H04L 5/0053; H04W 36/30; H04W 40/12; H04W 72/08; H04W 24/00
USPC ........................ 370/329, 330, 252
See application file for complete search history.

(56) References Cited

U.S. PATENT DOCUMENTS

| | | | |
|---|---|---|---|
| 2008/0080560 A1 | 4/2008 | Inoue et al. | |
| 2009/0080379 A1 | 3/2009 | Takashima | |
| 2009/0207803 A1* | 8/2009 | Kawamura et al. | 370/330 |
| 2009/0303937 A1* | 12/2009 | Sawahashi et al. | 370/329 |

(Continued)

FOREIGN PATENT DOCUMENTS

| | | |
|---|---|---|
| JP | 2007-243898 | 9/2007 |
| JP | 2008-092051 | 4/2008 |

(Continued)

OTHER PUBLICATIONS

International Search Report issued for corresponding International Patent Application No. PCT/JP2009/061346, mailed Aug. 18, 2009.

(Continued)

*Primary Examiner* — Helal A Algahaim
*Assistant Examiner* — Mahmoud Ismail
(74) *Attorney, Agent, or Firm* — Myers Wolin, LLC

(57) ABSTRACT

The base station determines a possibly-allocated domain, which is a band that may be used in communication with the mobile station, with respect to each mobile station, and determines a frequency band to be allocated to the mobile station within the determined possibly-allocated domain. Then, the base station transmits possibly-allocated-domain information indicating the possibly-allocated domain and allocation information, which is information indicating allocation of the frequency band, to the mobile station. Then, the base station and the mobile station communicate with each other in accordance with the possibly-allocated-domain information and the allocation information.

3 Claims, 22 Drawing Sheets

(56) References Cited

U.S. PATENT DOCUMENTS

2009/0310549 A1 12/2009 Higuchi et al.
2010/0165933 A1* 7/2010 Fukui et al. .................. 370/329

FOREIGN PATENT DOCUMENTS

| JP | 2008-118311 | 5/2008 |
| JP | 2008-236427 | 10/2008 |
| JP | 2008-301422 | 12/2008 |
| JP | 2009-077317 | 4/2009 |
| WO | WO 2006134946 A1 * | 12/2006 |
| WO | 2007/148590 | 12/2007 |
| WO | WO 2007148590 A1 * | 12/2007 |
| WO | 2008/041417 | 4/2008 |
| WO | WO 2008041417 A1 * | 4/2008 |

OTHER PUBLICATIONS

3GPP TS 36.213 V8.5.0 (Dec. 2008); 3rd Generation Partnership Project; Technical Specification Group Radio Access Network; "Evolved Universal Terrestrial Radio Access (E-UTRA); Physical layer procedures", (Release 8); Dated Dec. 2008.
3GPP TS 36.211 V8.5.0 (Dec. 2008); 3rd Generation Partnership Project; Technical Specification Group Radio Access Network; "Evolved Universal Terrestrial Radio Access (E-UTRA); Physical Channels and Modulation", (Release 8); Dated Dec. 2008.

* cited by examiner

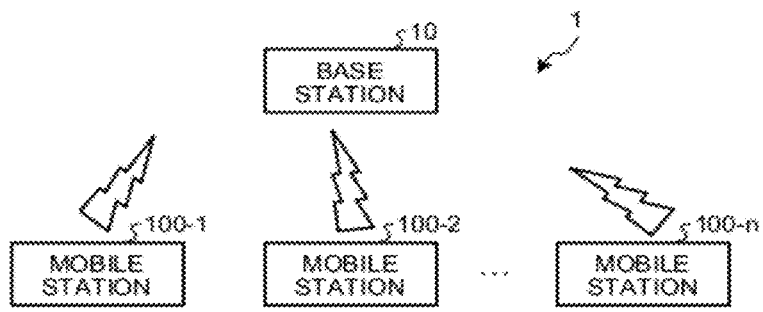
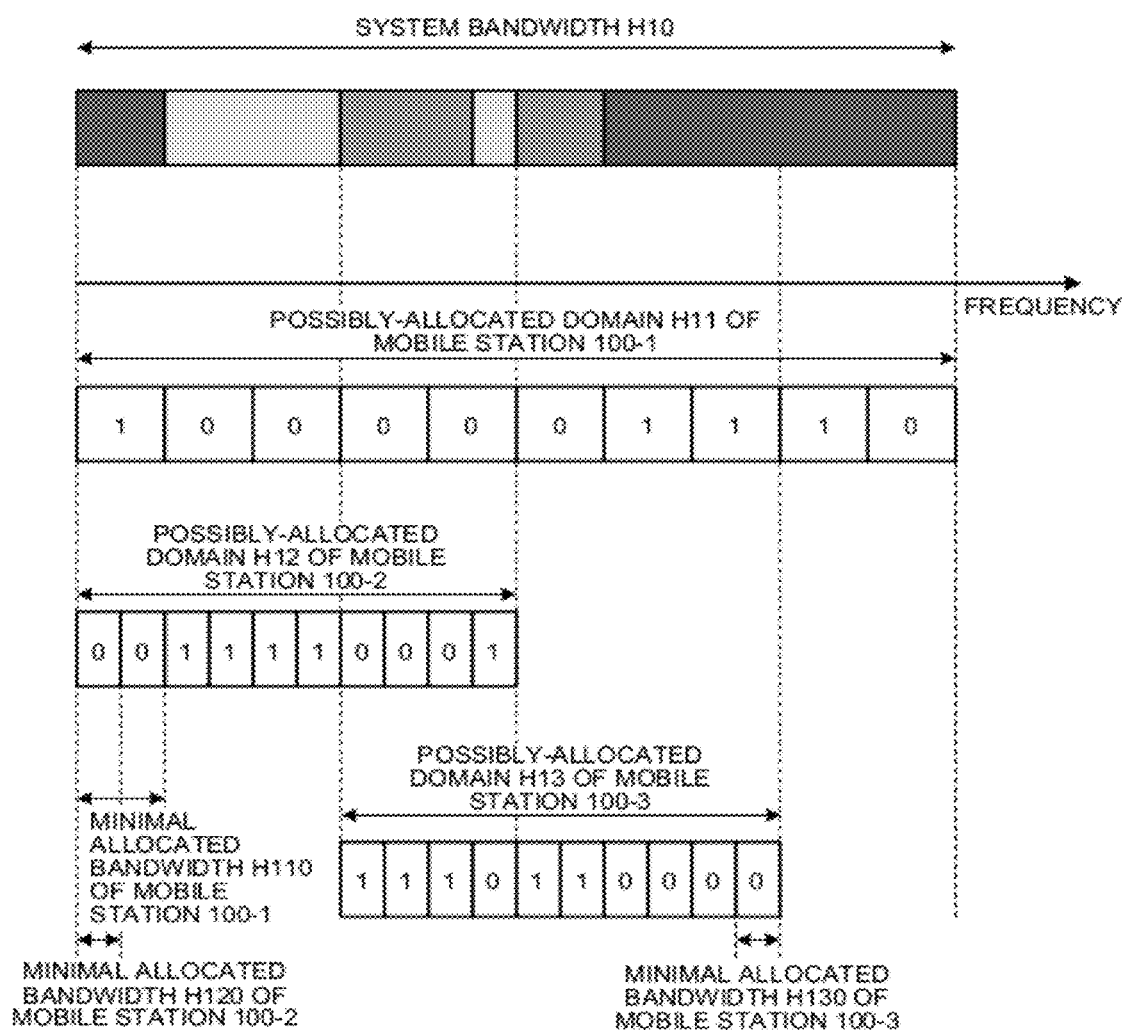

COMMUNICATION SYSTEM, TRANSMITTING STATION, AND MOBILE STATION, FOR DETERMINING ALLOCATION OF FREQUENCY BAND USED IN COMMUNICATION

CROSS-REFERENCE TO RELATED APPLICATION

This application is a continuation of International Application No. PCT/JP2009/061346, filed on Jun. 22, 2009, the entire contents of which are incorporated herein by reference.

FIELD

The embodiments discussed herein are directed to a communication system, a transmitting station, a mobile station, and a communication method.

BACKGROUND

In a mobile communication system, a signal transmitted from a base station propagates through various paths (also called "propagation paths") by reflection, diffraction, or scattering and reaches a mobile station. Here we explain it with an example illustrated in FIG. 19. FIG. 19 is a diagram for explaining multipath. In the example illustrated in FIG. 19, a signal transmitted from a base station 91 propagates through paths PT1 to PT3 and reaches a mobile station 92. In this manner, a plurality of paths through which one signal propagates is called multipath.

When a signal propagates through multipath like the above example, an arrival time at which the signal reaches a mobile station differs according to path. Here we explain it with an example illustrated in FIG. 20. FIG. 20 is a diagram illustrating an example of a time-domain power profile. In the example illustrated in FIG. 20, a signal which has propagated through the path PT1 reaches the mobile station first, then a signal which has propagated through the path PT2 reaches the mobile station, and then, a signal which has propagated through the path PT3 reaches the mobile station. Therefore, like an example illustrated in FIG. 21, a signal that the mobile station receives significantly fluctuates in amplitude in a frequency domain.

Therefore, some mobile communication systems select a frequency band having good channel quality in communication and establish communication using the selected frequency band. Specifically, a base station allocates a frequency band having good channel quality out of frequency bands that can be used in communication with mobile stations (hereinafter, referred to as a "system bandwidth") to each mobile station. Then, the base station transmits allocation information, which is information of the allocated frequency band, to each mobile station. And then, the base station and the mobile station communicate with each other using the allocated frequency band. Such a process for allocation of a frequency band is sometimes called frequency scheduling.

Here we explain it with an example illustrated in FIG. 22. Incidentally, in the example illustrated in FIG. 22, the base station 91 shall communicate with three mobile stations 92a to 92c. Like the example illustrated in FIG. 22, a frequency band A has good channel quality in communication between the base station 91 and the mobile station 92a. Therefore, in the example illustrated in FIG. 22, the base station 91 allocates the frequency band A to the mobile station 92a, and communicates with the mobile station 92a using the frequency band A. For the same reason, in the example illustrated in FIG. 22, the base station 91 communicates with the mobile station 92b using frequency bands B and D, and communicates with the mobile station 92c using frequency bands C and E.

When such frequency scheduling is performed, a base station acquires quality information indicating the channel quality from a mobile station or measures the channel quality by its own self. Here we explain it more specifically with reference to FIGS. 23 and 24. FIG. 23 is a diagram illustrating an example of a common pilot in a downlink. FIG. 24 is a diagram illustrating an example of a pilot for channel-quality measurement in an uplink.

For example, when the base station performs downlink communication with mobile stations, as illustrated in FIG. 23, the base station uses the entire system bandwidth to transmit a pilot signal to the mobile stations. Each of the mobile stations measures the channel quality using the pilot signal received from the base station, and transmits quality information indicating the measured channel quality to the base station. Then, the base station performs frequency scheduling on the basis of the quality information received from the mobile stations.

Furthermore, for example, when uplink communication is performed, like the example illustrated in FIG. 24, each of the mobile stations transmits a pilot signal for channel-quality measurement to the base station. The base station measures the channel quality on the basis of the pilot signal for channel-quality measurement, and performs frequency scheduling on the basis of the measured channel quality.

Incidentally, in the example illustrated in FIG. 24, the mobile station 92a transmits a pilot signal for channel-quality measurement using the entire system bandwidth at pilot-signal transmission intervals. On the other hand, the mobile stations 92b and 92c transmit a pilot signal for channel-quality measurement by changing a frequency band at pilot-signal transmission intervals. Namely, the mobile stations 92b and 92c cover the entire system bandwidth by transmitting the pilot signal several times by frequency hopping.

As an example of a transmission scheme for performing the frequency scheduling described above, OFDM (Orthogonal Frequency Division Multiplexing) is well known. In the case of using the OFDM, the base station designates a frequency band to be allocated to a mobile station in bitmap format. Then, the base station transmits allocation information, which is information on the frequency band allocated in bitmap format, to the mobile station.

Specifically, like an example illustrated in FIG. 25, the system bandwidth is divided into resource blocks by the minimal bandwidth allocated to a mobile station (hereinafter, referred to as the "minimal allocated bandwidth"), and with respect to each of the divided resource blocks, whether or not to allocate a resource block to the mobile station is designated by a bit code. Incidentally, in the example illustrated in FIG. 25, a resource block with "1" set in a bitmap denotes that the resource block is used in communication; a resource block with "0" set in the bitmap denotes that the resource block is not used in communication.

Namely, in the example illustrated in FIG. 25, with respect to the mobile station 92a, the base station allocates resource blocks B11 to B13 out of resource blocks B11 to B21 to the mobile station 92a. Furthermore, the base station allocates resource blocks B14, B15, and B17 to the mobile station 92b, and allocates resource blocks B16 and B18 to B21 to the mobile station 92c.

Non-patent document 1: 3GPP, TS36.211 V8.5.0 Evolved Universal Terrestrial Radio Access (E-UTRA); Physical Channels and Modulation (Release 8)

Non-patent document 2: 3GPP, TS36.213 V8.5.0 Evolved Universal Terrestrial Radio Access (E-UTRA); Physical layer procedures (Release 8)

However, the above-described conventional technology has a problem that it is difficult to finely allocate a frequency band to each mobile station. Specifically, to narrow a frequency band to be allocated to each mobile station, the minimal allocated bandwidth is reduced; however, in this case, the size of allocation information is increased. For example, in the case of using the OFDM as a transmission scheme, the number of bits designated in bitmap format is increased. Therefore, if a frequency band is finely allocated to each mobile station, an amount of control information transmitted and received between the base station and the mobile station is increased.

SUMMARY

According to an aspect of an embodiment of the invention, a communication system includes a transmitting station and a mobile station, the transmitting station including a domain determining unit that determines a possibly-allocated domain, which is a band that may be used in communication with the mobile station, with respect to each mobile station; an allocation determining unit that determines allocation of a frequency band used in the communication with the mobile station within the possibly-allocated domain determined by the domain determining unit on the basis of quality information indicating quality of communication with the mobile station; and a transmitting unit that transmits possibly-allocated-domain information indicating the possibly-allocated domain determined by the domain determining unit and allocation information indicating the allocation of the frequency band determined by the allocation determining unit to the mobile station, and the mobile station communicating with the transmitting station in accordance with the possibly-allocated-domain information and allocation information transmitted by the transmitting unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a diagram illustrating a configuration example of a communication system according to a first embodiment;

FIG. 2 is a diagram illustrating an example of a frequency scheduling process performed by a base station in the first embodiment;

DESCRIPTION OF EMBODIMENTS

Preferred embodiments of the present invention will be explained in detail below with reference to accompanying drawings. Incidentally, in the embodiments below, there is described a communication system using OFDM as an example of a transmission scheme. However, the present invention is also applicable to a communication system using a transmission scheme related to FDM (Frequency Division Multiplexing) which is a transmission scheme other than the OFDM. For example, the present invention can be applied to communication systems using other transmission schemes, such as OFDMA (Orthogonal Frequency Division Multiplexing Access), DFTS (Discrete Fourier Transform Spread)-OFDM, and Clustered DFTS-OFDM.

Incidentally, in a first embodiment, there is described the case where the present invention is applied to downlink communication; in a second embodiment, there is described the case where the present invention is applied to uplink communication. Furthermore, in third and subsequent embodiments, other embodiments of the present invention are described.

[a] First Embodiment

Configuration of Communication System

First, a communication system 1 according to the first embodiment is explained with reference to FIG. 1. FIG. 1 is a diagram illustrating a configuration example of the communication system 1 according to the first embodiment. In the example illustrated in FIG. 1, the communication system 1 uses OFDM as a transmission scheme. As illustrated in FIG. 1, the communication system 1 has a base station 10, which is a transmitting station, and mobile stations 100-1 to 100-n. Incidentally, in the description below, when it is not necessary to specify any of the mobile stations 100-1 to 100-n, the mobile stations 100-1 to 100-n may be collectively referred to as the mobile station 100.

Figure 19:
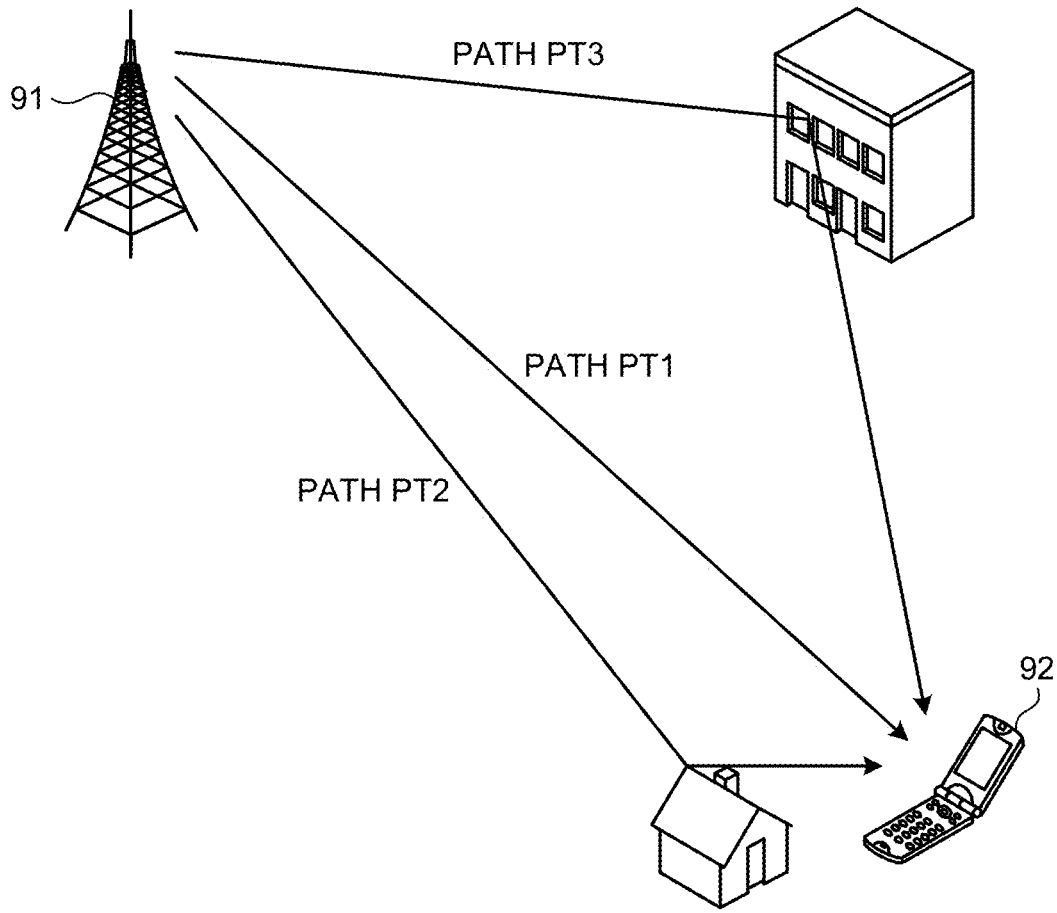
FIG. 19 is a diagram for explaining multipath.
Figure 20:
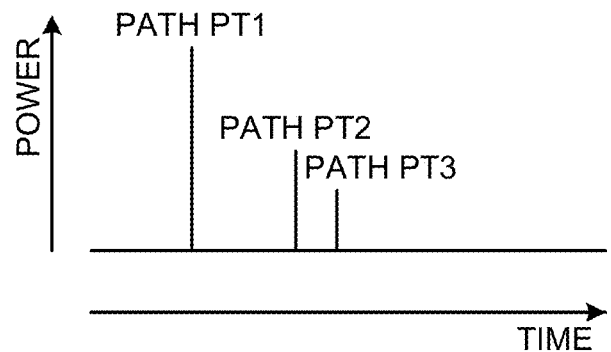
FIG. 20 is a diagram illustrating an example of a time-domain power profile.
Figure 21:
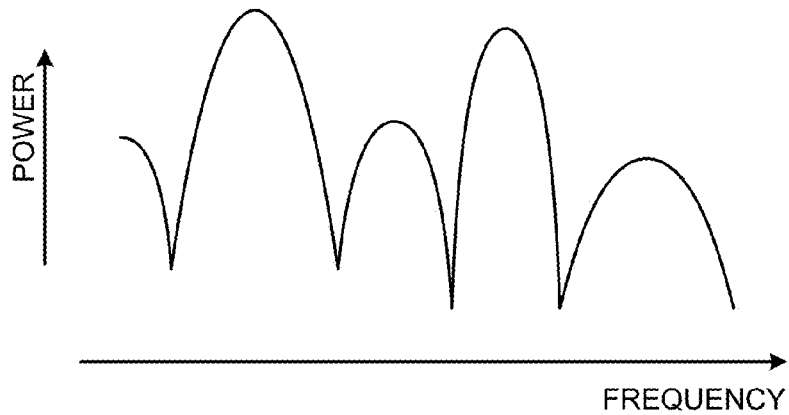
FIG. 21 is a diagram illustrating an example of a frequency selective channel.
Figure 22:
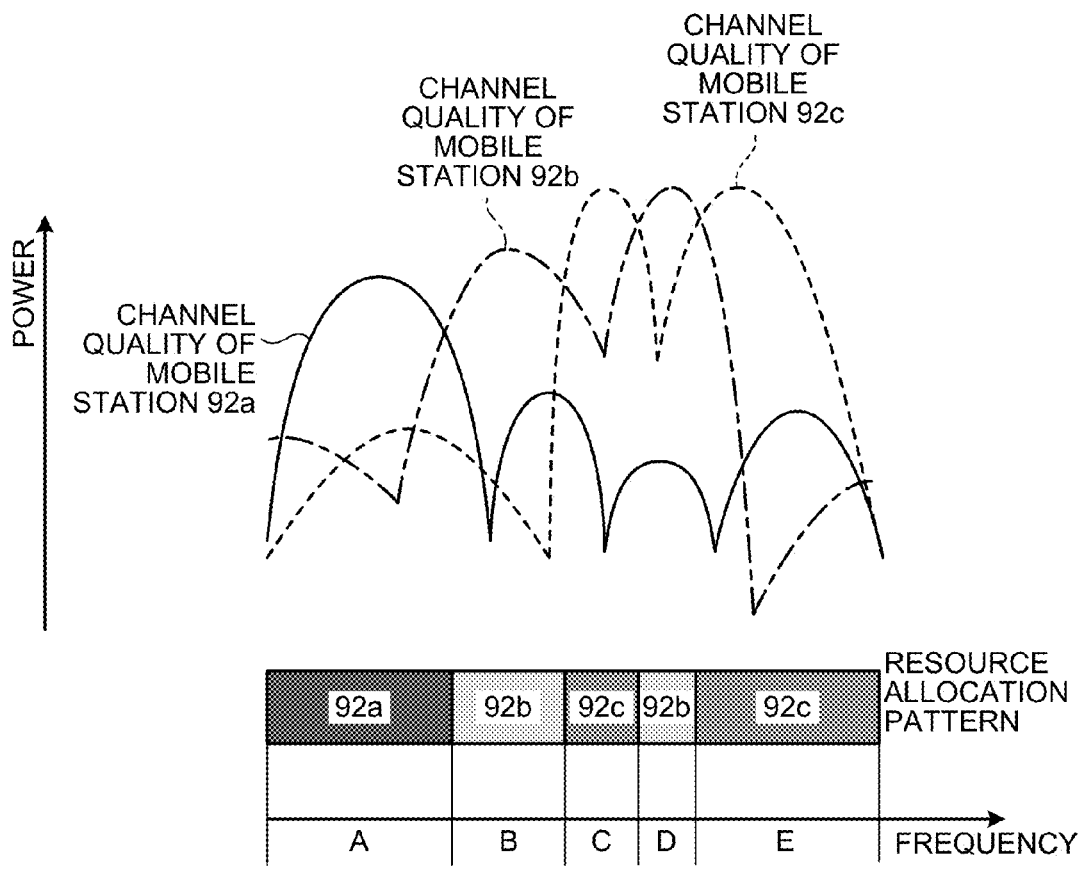
FIG. 22 is a diagram illustrating an example of a conventional frequency scheduling process.
Figure 23:
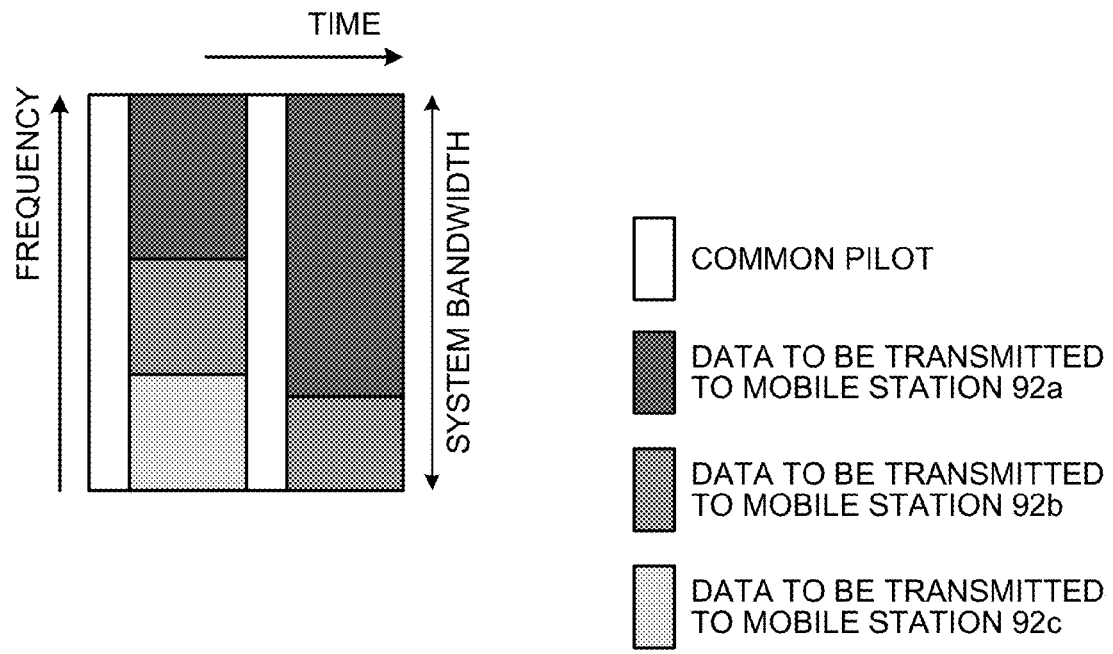
FIG. 23 is a diagram illustrating an example of a common pilot in a downlink.
Figure 24:
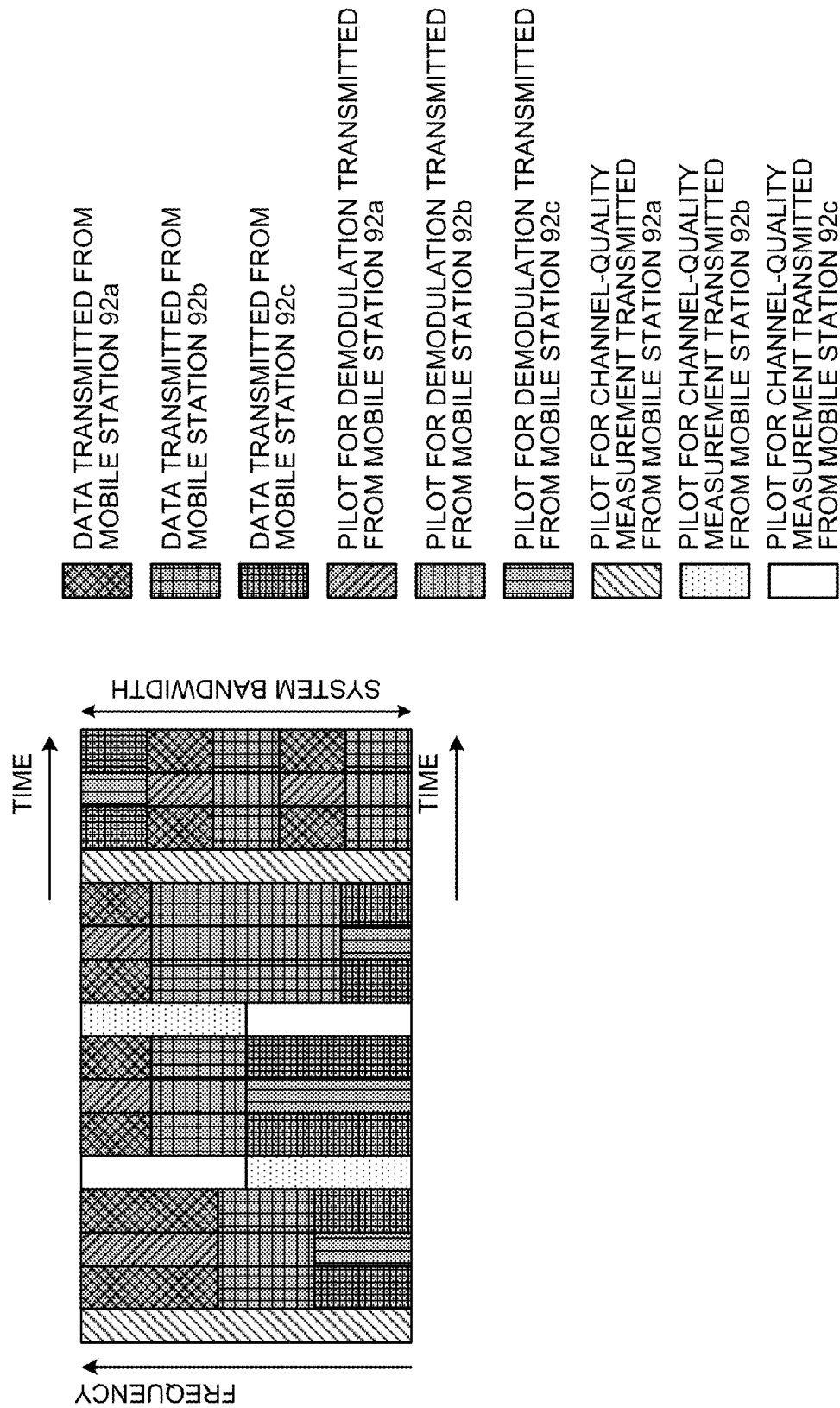
FIG. 24 is a diagram illustrating an example of a pilot for channel-quality measurement in an uplink.

The base station 10 transmits and receives various signals with the mobile stations 100-1 to 100-n. Like the example illustrated in FIG. 19, a signal transmitted from the base station 10 propagates through a plurality of paths and reaches the mobile stations 100-1 to 100-n. The mobile stations 100-1 to 100-n receive a signal transmitted from the base station 10 through a plurality of paths.

When the base station 10 in the first embodiment performs downlink communication with each mobile station, the base station 10 first determines a band that may be used in communication with each mobile station (hereinafter, referred to as a "possibly-allocated domain") with respect to each of the mobile stations. Furthermore, the base station 10 receives quality information indicating the quality of communication from each mobile station, and determines a frequency band to be allocated to each mobile station on the basis of the received quality information. At this time, the base station 10 determines the frequency band to be allocated to each mobile station within the possibly-allocated domain allocated to each mobile station. Then, the base station 10 transmits possibly-allocated-domain information indicating the possibly-allocated domain and allocation information, which is information indicating allocation of the frequency band, to the mobile station 100. Then, the mobile station 100 receives a signal transmitted from the base station 10 in accordance with the possibly-allocated-domain information and allocation information received from the base station 10.

Here we explain it more specifically with reference to FIG. 2. FIG. 2 is a diagram illustrating an example of a frequency scheduling process performed by the base station 10 in the first embodiment. Incidentally, in FIG. 2, as an example, there is described the case where the base station 10 performs downlink communication with three mobile stations 100-1 to 100-3.

Figure 25:
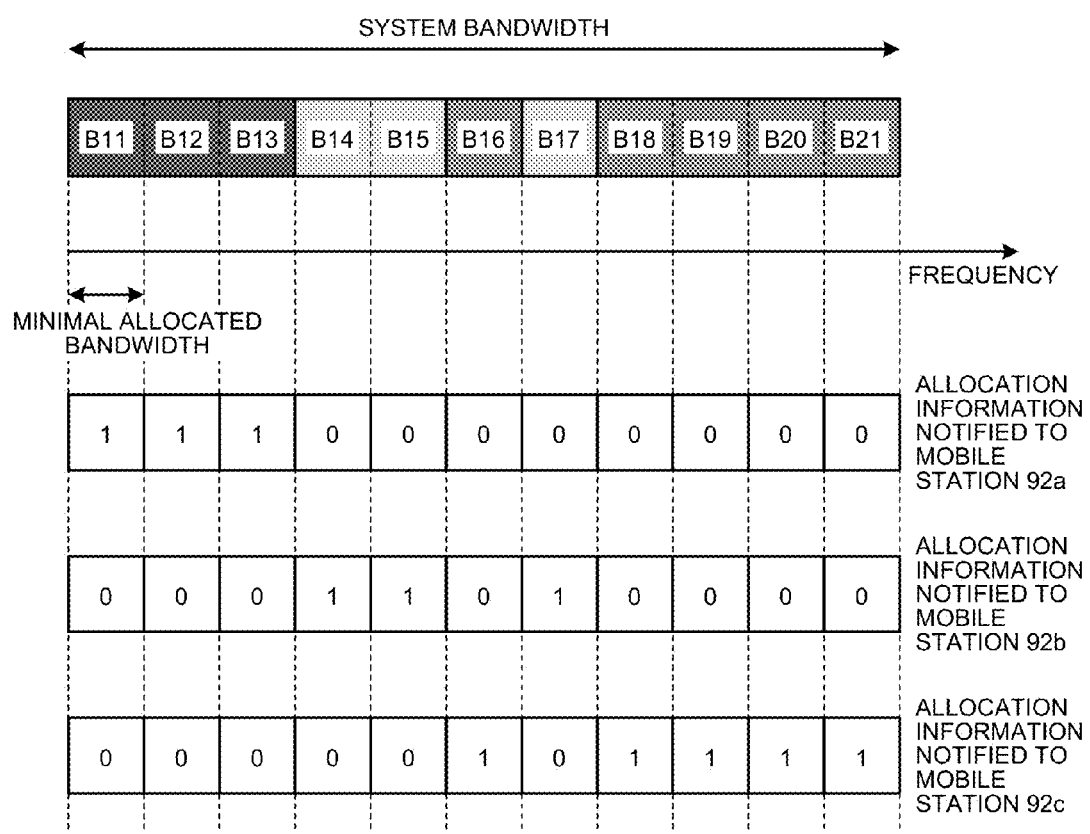
FIG. 25 is a diagram illustrating an example of allocation information designated in a bitmap.

In the example illustrated in FIG. 2, the base station 10 determines to set a possibly-allocated domain H11 out of a system bandwidth H10 as a possibly-allocated domain of the mobile station 100-1. Specifically, in the same manner as the example illustrated in FIG. 25, the base station 10 determines to set the possibly-allocated domain H11 having the same bandwidth as the system bandwidth H10 as a possibly-allocated domain of the mobile station 100-1.

Furthermore, in the example illustrated in FIG. 2, the base station 10 determines to set a possibly-allocated domain H12 as a possibly-allocated domain of the mobile station 100-2. Specifically, the base station 10 determines to set the possibly-allocated domain H12 having nearly half the bandwidth of the system bandwidth H10 as a possibly-allocated domain of the mobile station 100-2. Moreover, in the example illustrated in FIG. 2, the base station 10 determines to set a possibly-allocated domain H13 having nearly half the bandwidth of the system bandwidth H10 as a possibly-allocated domain of the mobile station 100-3.

Then, the base station 10 allocates frequency bands to be actually used in communication with the mobile stations 100-1 to 100-3 from the possibly-allocated domains H11 to H13, respectively. For example, in the example illustrated in FIG. 2, the base station 10 divides the possibly-allocated domain H11 into ten resource blocks by a minimal allocated bandwidth H110. Then, the base station 10 allocates four resource blocks out of the ten resource blocks to the mobile station 100-1. Specifically, as illustrated in FIG. 2, the base station 10 allocates the first and seventh to ninth resource blocks from the left out of the ten resource blocks to the mobile station 100-1.

Furthermore, in the example illustrated in FIG. 2, the base station 10 divides the possibly-allocated domain H12 into ten resource blocks by a minimal allocated bandwidth H120. Then, the base station 10 allocates five resource blocks out of the ten resource blocks to the mobile station 100-2. Moreover, in the example illustrated in FIG. 2, the base station 10 divides the possibly-allocated domain H13 into ten resource blocks by a minimal allocated bandwidth H130, and allocates five resource blocks out of the ten resource blocks to the mobile station 100-3.

Then, the base station 10 transmits possibly-allocated-domain information indicating the possibly-allocated domain and allocation information designated in bitmap format to the mobile stations 100-1 to 100-3. For example, in the example illustrated in FIG. 2, the base station 10 transmits possibly-allocated-domain information indicating the possibly-allocated domain H11 and allocation information designated by "1", "0", "0", . . . , "1", "1", "0" in bitmap format to the mobile station 100-1. Likewise, the base station 10 transmits possibly-allocated-domain information indicating the possibly-allocated domain H12 and allocation information "0", "0", "1", . . . , "0", "0", "1" to the mobile station 100-2. Likewise, the base station 10 transmits possibly-allocated-domain information indicating the possibly-allocated domain H13 and allocation information "1", "1", "1", . . . , "0", "0", "0" to the mobile station 100-3.

Upon receipt of the information, the mobile stations 100-1 to 100-3 receive a signal transmitted from the base station 10 in accordance with the possibly-allocated-domain information and the allocation information. For example, the mobile station 100-1 receives a signal of a frequency band designated by "1" in bitmap format out of the possibly-allocated domain H11.

In this manner, with respect to each of the mobile stations, the base station 10 determines a possibly-allocated domain that may be used in communication with the mobile station, and determines a frequency band in which the communication is actually performed within the determined possibly-allocated domain. This enables the base station 10 to finely allocate a frequency band to each mobile station.

Here we explain it with the example illustrated in FIG. 2, when the base station 10 performs communication with the mobile station 100-2, the base station 10 determines to set nearly half the bandwidth of the system bandwidth H10 as the possibly-allocated domain H12. Then, the base station 10 divides the possibly-allocated domain H12 into ten; therefore, a frequency band to be allocated to the mobile station 100-2 can be narrowed as compared with the case where the system bandwidth H10 is divided by ten. Furthermore, the possibly-allocated domain H12 is a bandwidth narrower than the system bandwidth H10, so the base station 10 can narrow a frequency band to be allocated to the mobile station 100-2 without increasing a dividing number of the possibly-allocated domain H12. As a result, the base station 10 can finely allocate a frequency band to the mobile station 100-2 without increasing the size of allocation information. For the same reason, the base station 10 can finely allocate a frequency band to the mobile station 100-3.

Incidentally, in the example illustrated in FIG. 2, the base station 10 sets the same bandwidth as the system bandwidth H10 as the possibly-allocated domain H11. In this way, the base station 10 can set the same bandwidth as the system bandwidth H10 as a possibly-allocated domain in the same manner as the example illustrated in FIG. 25.

Configuration of Base Station in First Embodiment

Figure 3:
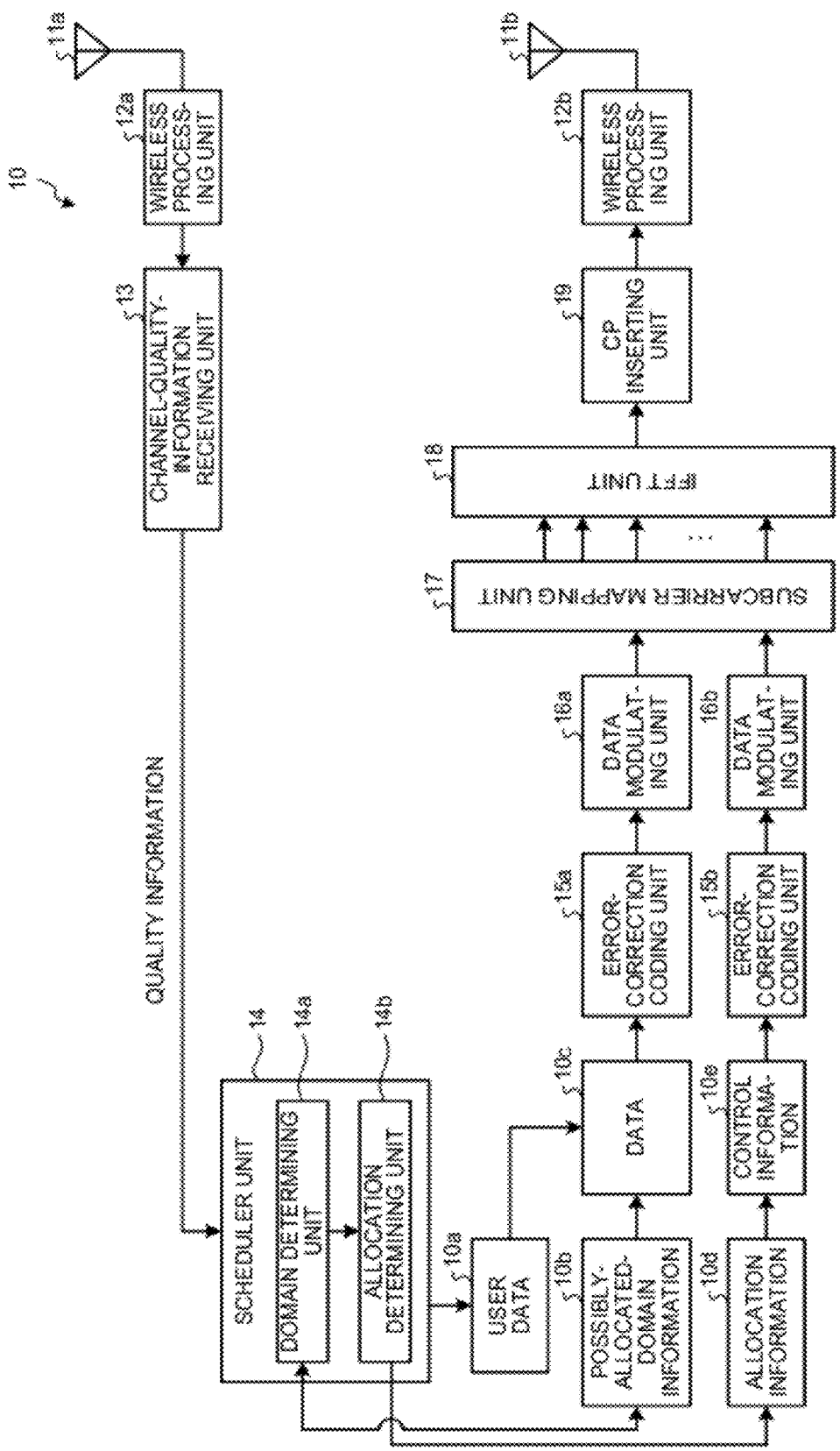
FIG. 3 is a diagram illustrating a configuration example of the base station in the first embodiment.

Subsequently, a configuration of the base station 10 in the first embodiment is explained with reference to FIG. 3. FIG. 3 is a diagram illustrating a configuration example of the base station 10 in the first embodiment. Incidentally, in FIG. 3, processing units involved in downlink communication are mainly illustrated.

In the example illustrated in FIG. 3, the base station 10 has antennas 11a and 11b, wireless processing units 12a and 12b, a channel-quality-information receiving unit 13, a scheduler unit 14, error-correction coding units 15a and 15b, data modulating units 16a and 16b, a subcarrier mapping unit 17, an IFFT (Inverse Fast Fourier Transform) unit 18, and a CP (Cyclic prefix) inserting unit 19.

The antenna 11a receives a signal transmitted from outside. For example, the antenna 11a receives a signal transmitted from the mobile station 100. The antenna 11b transmits a signal to outside. For example, the antenna 11b transmits a signal to the mobile station 100. Incidentally, FIG. 3 illustrates the configuration example of the base station 10 having the receiving antenna 11a and the transmitting antenna 11b; however, the base station 10 can have one transmitting and receiving antenna.

The wireless processing unit 12a converts a signal received by the antenna 11a into a baseband signal. The channel-quality-information receiving unit 13 receives quality information transmitted from the mobile station 100 out of the signal converted into the baseband signal by the wireless processing unit 12a. Incidentally, the quality information transmitted from the mobile station 100 will be described later.

The scheduler unit 14 performs a frequency scheduling process on the basis of the quality information received by the channel-quality-information receiving unit 13. Specifically, as illustrated in FIG. 3, the scheduler unit 14 has a domain determining unit 14a and an allocation determining unit 14b.

The domain determining unit 14a determines a possibly-allocated domain, which is a band that may be used in downlink communication with the mobile station 100, with respect to each mobile station. For example, when no quality information is received from the mobile station 100, the domain determining unit 14a randomly determines a possibly-allocated domain. Furthermore, when quality information has been received from the mobile station 100, the domain determining unit 14a sets, for example, a frequency band having good channel quality as a possibly-allocated domain on the basis of the quality information.

A process performed by the domain determining unit 14a is explained with an example. Here, the base station 10 shall communicate with three mobile stations 100-1 to 100-3. In such a condition, when no quality information is received, the domain determining unit 14a can divide the system bandwidth, for example, into three bands A1 to A3, and set the divided bands A1 to A3 as possibly-allocated domains of the mobile stations 100-1 to 100-3, respectively. Or, when no quality information is received, like the example illustrated in FIG. 25, the domain determining unit 14a can set the system bandwidth as respective possibly-allocated domains of the mobile stations 100-1 to 100-3.

Furthermore, in the above example, when quality information has been received, the domain determining unit 14a can set a frequency band having good quality as a possibly-allocated domain. Or, when quality information has been received several times, the domain determining unit 14a can set a frequency band having the good average of the several pieces of previous quality information as a possibly-allocated domain.

In this manner, when no quality information is received, the domain determining unit 14a randomly determines a possibly-allocated domain of each mobile station; after quality information has been received, the domain determining unit 14a can determine a domain having good channel quality as a possibly-allocated domain of each mobile station.

The allocation determining unit 14b allocates a frequency band used in the downlink communication to the mobile station 100 on the basis of the quality information received by the channel-quality-information receiving unit 13. Specifically, the allocation determining unit 14b determines a frequency band to be allocated to the mobile station 100 within the possibly-allocated domain determined by the domain determining unit 14a. For example, the allocation determining unit 14b allocates a frequency band to the mobile station 100 with an algorithm such as proportional fairness or round robin.

Then, the scheduler unit 14 multiplexes user data 10a to be transmitted to the mobile station 100 and possibly-allocated-domain information 10b indicating the possibly-allocated domain determined by the domain determining unit 14a. Then, the scheduler unit 14 inputs multiplexed data 10c to the error-correction coding unit 15a. Furthermore, the scheduler unit 14 inputs, as control information 10e, allocation information 10d indicating the frequency band allocated by the allocation determining unit 14b to the error-correction coding unit 15b. Incidentally, in the first embodiment, the allocation information 10d is information designated in bitmap format.

The error-correction coding unit 15a adds an error correcting code to the data 10c input from the scheduler unit 14. The data modulating unit 16a modulates the data 10c error-correction-coded by the error-correction coding unit 15a. Then, the data modulating unit 16a outputs the modulated data to the subcarrier mapping unit 17.

The error-correction coding unit 15b adds an error correcting code to the control information 10e input from the scheduler unit 14. The data modulating unit 16b modulates the control information 10e error-correction-coded by the error-correction coding unit 15b. Then, the data modulating unit 16b outputs the modulated control information to the subcarrier mapping unit 17.

The subcarrier mapping unit 17 maps a modulation symbol of the data modulated by the data modulating unit 16a and a modulation symbol of the control information modulated by the data modulating unit 16b to subcarriers. The IFFT unit 18 performs inverse fast Fourier transform on the modulation symbol mapped to the subcarrier by the subcarrier mapping unit 17. By performing this process, the IFFT unit 18 transforms the frequency-domain modulation symbol into a time-domain effective symbol.

The CP inserting unit 19 copies the end of the effective symbol input from the IFFT unit 18 as a CP (Cyclic prefix) and inserts the CP into the head of the effective symbol, thereby generating an OFDM symbol. The wireless processing unit 12b converts the OFDM symbol into which the CP has been inserted by the CP inserting unit 19 into a predetermined radio frequency, and transmits the converted signal to the mobile station 100 via the antenna 11b.

Figure 4:
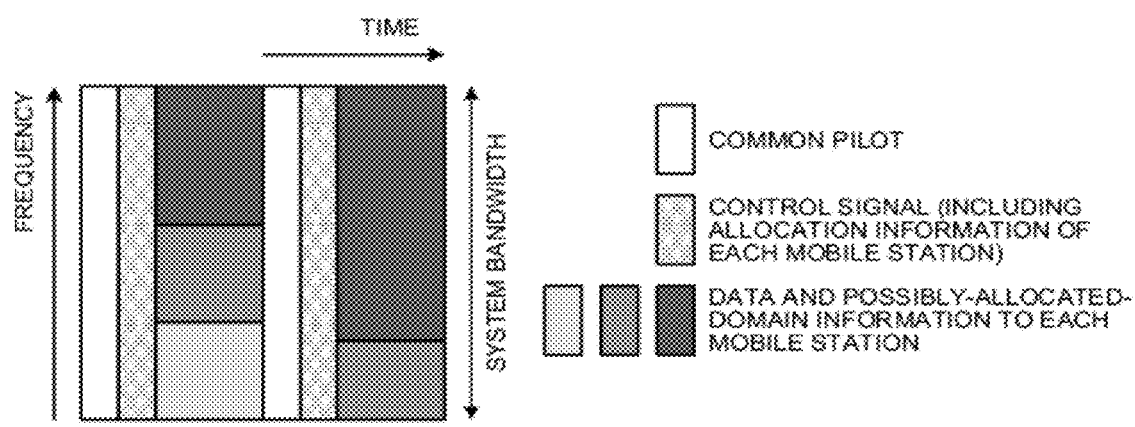
FIG. 4 is a diagram illustrating an example of a subchannel to which possibly-allocated-domain information or allocation information is mapped.

Here, a subchannel to which possibly-allocated-domain information or allocation information is mapped is explained with reference to FIG. 4. FIG. 4 is a diagram illustrating an example of a subchannel to which possibly-allocated-domain information or allocation information is mapped.

In the example illustrated in FIG. 4, the base station 10 first transmits a common pilot signal and a control signal using the entire system bandwidth. Then, the base station 10 multiplexes user data in predetermined frequency bands, and transmits the multiplexed user data to each mobile station. Here, the base station 10 includes the above-mentioned allocation information in the control signal, and transmits the control signal including the allocation information to the mobile station 100. Furthermore, the base station 10 includes the above-mentioned possibly-allocated-domain information in the user data, and transmits the user data including the possibly-allocated-domain information to the mobile station 100.

Configuration of Mobile Station in First Embodiment

Figure 5:
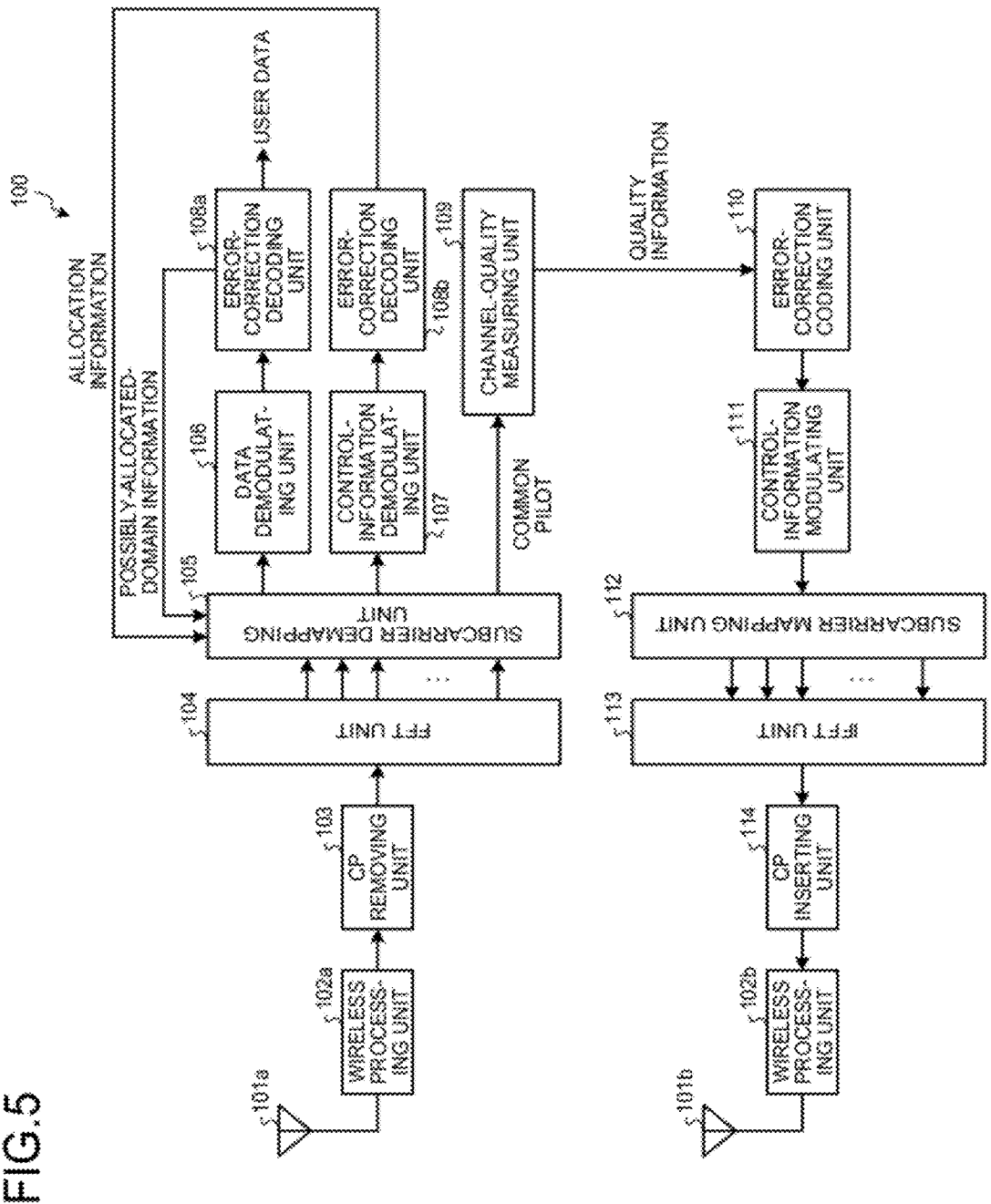
FIG. 5 is a diagram illustrating a configuration example of a mobile station in the first embodiment.

Subsequently, a configuration of the mobile station 100 in the first embodiment is explained with reference to FIG. 5. FIG. 5 is a diagram illustrating a configuration example of the mobile station 100 in the first embodiment. Incidentally, in FIG. 5, processing units involved in downlink communication are mainly illustrated.

In the example illustrated in FIG. 5, the mobile station 100 has antennas 101a and 101b, wireless processing units 102a and 102b, a CP removing unit 103, an FFT (Fast Fourier Transform) unit 104, a subcarrier demapping unit 105, a data demodulating unit 106, a control-information demodulating unit 107, error-correction decoding units 108a and 108b, a channel-quality measuring unit 109, an error-correction coding unit 110, a control-information modulating unit 111, a subcarrier mapping unit 112, an IFFT unit 113, and a CP inserting unit 114.

The antenna 101a receives a signal transmitted from outside. For example, the antenna 101a receives a signal transmitted from the base station 10. The antenna 101b transmits a signal to outside. For example, the antenna 101b transmits a signal to the base station 10. Incidentally, FIG. 5 illustrates the configuration example of the mobile station 100 having the receiving antenna 101a and the transmitting antenna 101b; however, the mobile station 100 can have one transmitting and receiving antenna.

The wireless processing unit 102a converts a signal received by the antenna 101a into a baseband signal. The CP removing unit 103 removes a CP from the signal converted into the baseband signal by the wireless processing unit 102a. The FFT unit 104 performs fast Fourier transform on the signal from which the CP has been removed by the CP removing unit 103, thereby transforming the time-domain signal into a frequency-domain signal.

The subcarrier demapping unit 105 separates the signal input from the FFT unit 104 into a data signal, a control-information signal, a common pilot, and the like. Then, the subcarrier demapping unit 105 inputs the data signal out of the separated various signals to the data demodulating unit 106, inputs the control-information signal to the control-information demodulating unit 107, and inputs the common pilot to the channel-quality measuring unit 109.

The data demodulating unit 106 demodulates the data signal input from the subcarrier demapping unit 105. The error-correction decoding unit 108a decodes an error correcting code included in the data signal demodulated by the data demodulating unit 106, and performs an error correction.

Then, the error-correction decoding unit 108a inputs possibly-allocated-domain information included in the data signal to the subcarrier demapping unit 105.

The control-information demodulating unit 107 demodulates the control-information signal input from the subcarrier demapping unit 105. The error-correction decoding unit 108b decodes an error correcting code included in the control-information signal demodulated by the control-information demodulating unit 107, and performs an error correction. Then, the error-correction decoding unit 108b inputs allocation information included in the control-information signal to the subcarrier demapping unit 105.

Here, the subcarrier demapping unit 105 calculates an "allocated domain", which is a frequency domain allocated to the mobile station 100, using the possibly-allocated-domain information input from the error-correction decoding unit 108a and the allocation information input from the error-correction decoding unit 108b. Specifically, the subcarrier demapping unit 105 calculates the frequency domain indicated in the allocation information out of the possibly-allocated domain indicated in the possibly-allocated-domain information as an "allocated domain". Then, the subcarrier demapping unit 105 extracts a signal of a frequency band in the allocated domain out of the data signal.

The channel-quality measuring unit 109 measures the channel quality on the basis of the common pilot signal input from the subcarrier demapping unit 105. Then, the channel-quality measuring unit 109 inputs quality information, which is information indicating the measured channel quality, to the error-correction coding unit 110.

For example, the channel-quality measuring unit 109 divides the pilot signal transmitted by using the entire system bandwidth (see FIG. 4) by a predetermined frequency band, and measures a radio-wave level of each pilot signal divided by the frequency band. Then, the channel-quality measuring unit 109 sets the radio-wave level measured with each frequency band as quality information.

The error-correction coding unit 110 adds an error correcting code to the quality information input from the channel-quality measuring unit 109. The control-information modulating unit 111 modulates the channel-quality information error-correction-coded by the error-correction coding unit 110. Then, the control-information modulating unit 111 outputs the modulated channel-quality information to the subcarrier mapping unit 112.

The subcarrier mapping unit 112 maps a modulation symbol of the quality information to a subcarrier. The IFFT unit 113 performs inverse fast Fourier transform on the modulation symbol mapped to the subcarrier by the subcarrier mapping unit 112, thereby transforming the frequency-domain modulation symbol into a time-domain effective symbol.

The CP inserting unit 114 inserts a CP into the effective symbol input from the IFFT unit 113, thereby generating an OFDM symbol. The wireless processing unit 102b converts the OFDM symbol into which the CP has been inserted by the CP inserting unit 114 into a predetermined radio frequency, and transmits the converted signal to the base station 10 via the antenna 101b.

Figure 6:
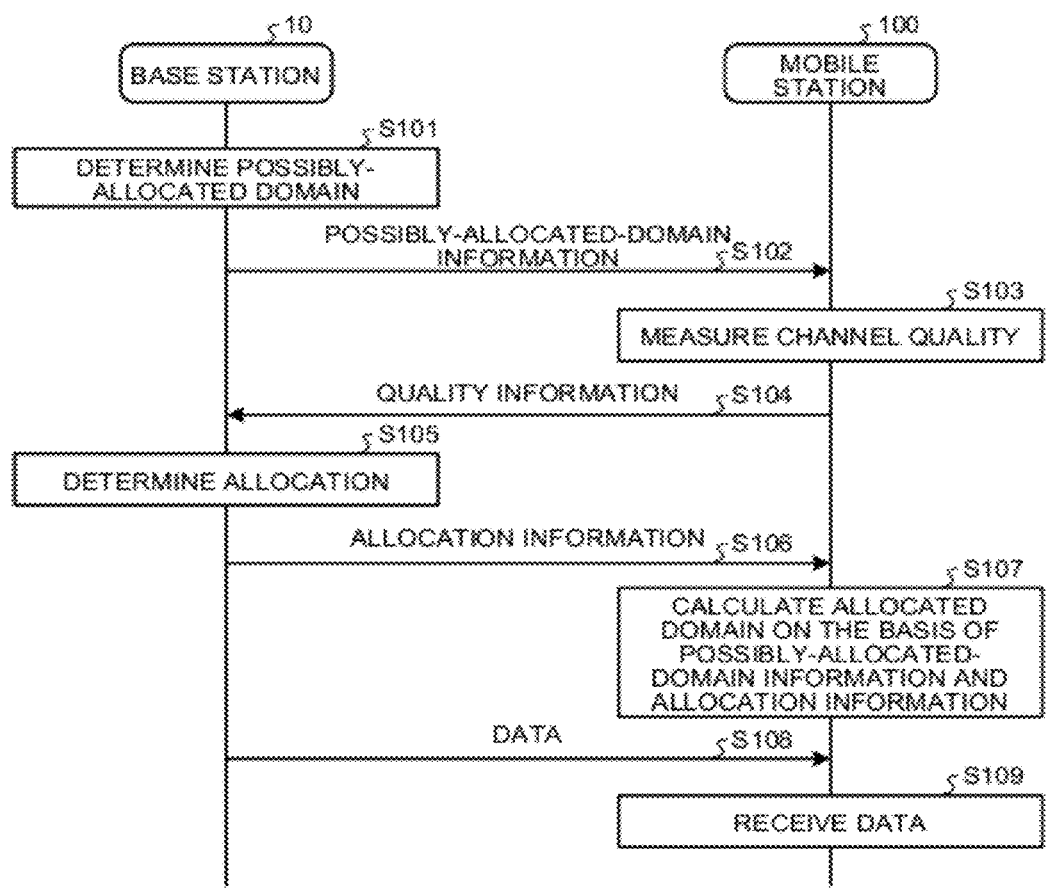
FIG. 6 is a sequence diagram illustrating a procedure of a frequency-band allocating process performed by the communication system according to the first embodiment.

Frequency-Band Allocating Process by Communication System According to First Embodiment Subsequently, a procedure of a frequency-band allocating process performed by the communication system 1 according to the first embodiment is explained with reference to FIG. 6. FIG. 6 is a sequence diagram illustrating the procedure of the frequency-band allocating process performed by the communication system 1 according to the first embodiment.

As illustrated in FIG. 6, first, the base station 10 determines a possibly-allocated domain with respect to each mobile station (Step S101). Then, the base station 10 transmits possibly-allocated-domain information indicating the determined possibly-allocated domain to the mobile station 100 (Step S102).

Subsequently, the mobile station 100 measures the channel quality on the basis of a common pilot transmitted from the base station 10 (Step S103). Then, the mobile station 100 transmits quality information indicating the measured channel quality to the base station 10 (Step S104).

Subsequently, the base station 10 determines a frequency band to be allocated to the mobile station 100 within the possibly-allocated domain determined at Step S101 (Step S105). Then, the base station 10 transmits allocation information, which is information on the frequency band allocated to the mobile station 100, to the mobile station 100 (Step S106).

Subsequently, the mobile station 100 calculates an allocated domain, which is a frequency domain allocated to the mobile station 100, on the basis of the possibly-allocated-domain information and allocation information received from the base station 10 (Step S107). Specifically, the mobile station 100 calculates the frequency band indicated in the allocation information out of the possibly-allocated domain indicated in the possibly-allocated-domain information as an allocated domain.

After that, when a data signal has been transmitted by the base station 10 (Step S108), the mobile station 100 extracts a signal in the allocated domain calculated at Step S107, and receives the data signal (Step S109).

Although not described above, the base station 10 periodically performs the possibly-allocated-domain determining process at Steps S101 and S102 illustrated in FIG. 6. For example, the base station 10 periodically receives quality information from the mobile station 100, and periodically changes the possibly-allocated domain on the basis of the received quality information. Then, each time the base station 10 changes the possibly-allocated domain, the base station 10 transmits the changed possibly-allocated domain to the mobile station 100.

Furthermore, the mobile station 100 periodically performs the channel-quality measuring process at Steps S103 and S104 illustrated in FIG. 6. For example, the mobile station 100 performs the channel-quality measuring process at transmission time intervals (TTI).

Moreover, the base station 10 periodically performs the allocation determining process at Steps S105 and S106 illustrated in FIG. 6. For example, the base station 10 performs the allocation determining process at TTI.

Incidentally, the intervals of the possibly-allocated-domain determining process, the intervals of the channel-quality measuring process, and the intervals of the allocation determining process need not be the same intervals. For example, the intervals of the possibly-allocated-domain determining process can be longer than the intervals of the channel-quality measuring process and the intervals of the allocation determining process.

Effect of First Embodiment

As described above, when downlink communication is performed in the communication system 1 according to the first embodiment, a possibly-allocated domain that may be used in downlink communication is determined with respect to each mobile station, and within the possibly-allocated domain, a frequency band used in the downlink communication is allocated to each mobile station. Therefore, the communication system 1 according to the first embodiment is capable of finely allocating a frequency band to each mobile station when downlink communication is performed.

[b] Second Embodiment

In the above first embodiment, downlink communication is taken as an example. However, the present invention can also be applied to the case of uplink communication. Therefore, in the second embodiment, the case of uplink communication is described.

Configuration of Communication System

First, a configuration of a communication system 2 according to the second embodiment is explained. The configuration of the communication system 2 according to the second embodiment is the same as the configuration example of the communication system 1 illustrated in FIG. 1. In the second embodiment, to distinguish the communication system 2 from the communication system 1 according to the first embodiment, the communication system 2 shall have a base station 20 and mobile stations 200-1 to 200-$n$. Incidentally, in the description below, when it is not necessary to specify any of the mobile stations 200-1 to 200-$n$, the mobile stations 200-1 to 200-$n$ shall be collectively referred to as the mobile station 200.

When uplink communication is performed with the mobile station 200, the base station 20 in the second embodiment receives a pilot signal for channel-quality measurement from the mobile station 200. Then, the base station 20 measures the channel quality on the basis of the pilot signal received from the mobile station 200. Furthermore, the base station 20 determines a possibly-allocated domain that may be used in communication with the mobile station 200. Moreover, the base station 20 allocates a frequency band in which communication is performed within the determined possibly-allocated domain to the mobile station 200. At this time, the base station 20 allocates the frequency band to the mobile station 200 on the basis of the measured channel quality described above. Then, the base station 20 transmits possibly-allocated-domain information indicating the possibly-allocated domain and allocation information, which is information indicating allocation of the frequency band, to the mobile station 200. Then, the mobile station 200 transmits a signal to the base station 20 in accordance with the possibly-allocated domain information and allocation information received from the base station 20. Details of the base station 20 and the mobile station 200 in the second embodiment are explained below.

Configuration of Base Station in Second Embodiment

Figure 7:
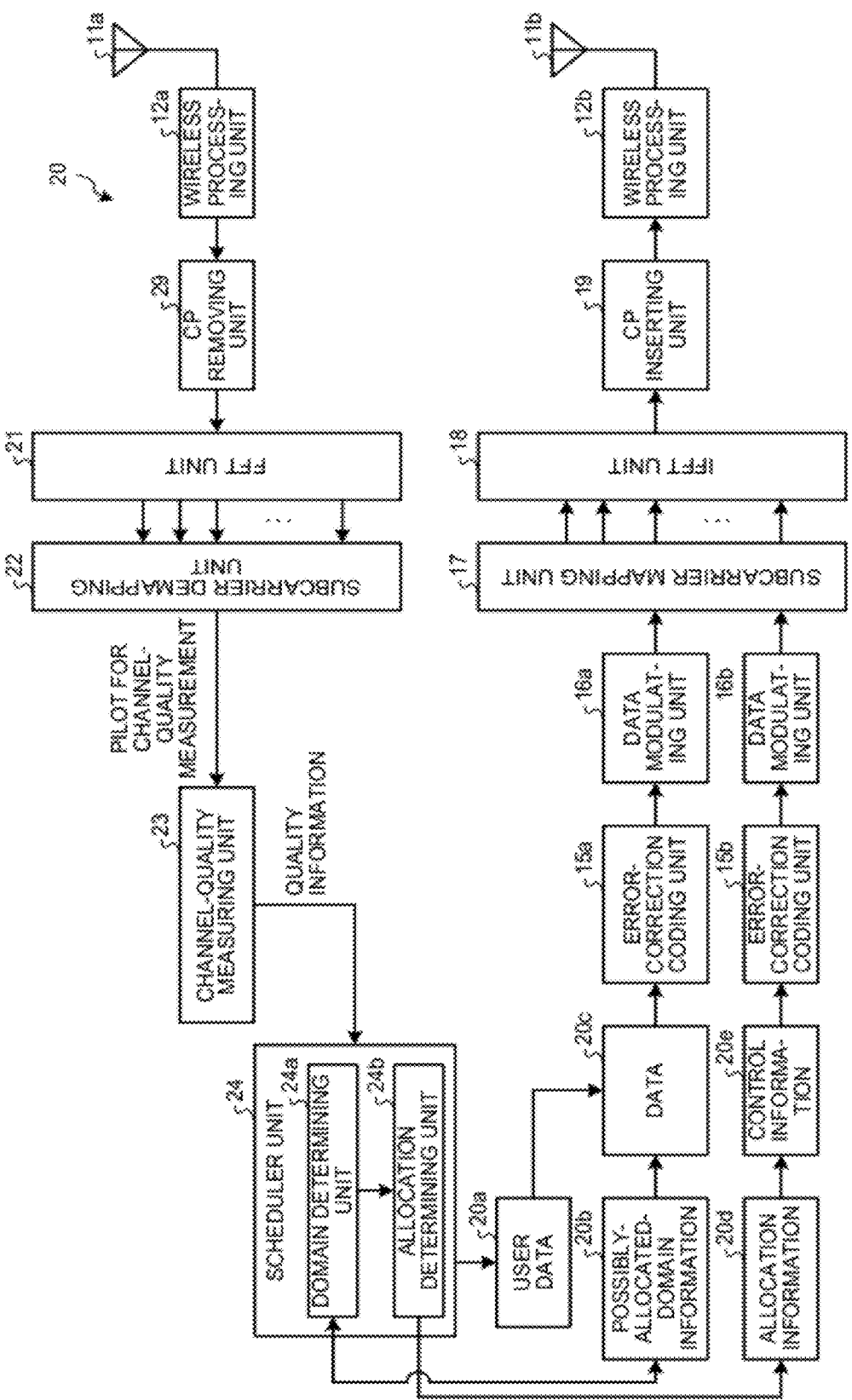
FIG. 7 is a diagram illustrating a configuration example of a base station in a second embodiment.

Subsequently, a configuration of the base station 20 in the second embodiment is explained with reference to FIG. 7. FIG. 7 is a diagram illustrating a configuration example of the base station 20 in the second embodiment. Incidentally, in FIG. 7, processing units involved in uplink communication are mainly illustrated. Furthermore, parts having the same function as the already-illustrated components are denoted by the same reference numerals, and detailed description of the parts is omitted.

In the example illustrated in FIG. 7, the base station 20 has the antennas 11$a$ and 11$b$, the wireless processing units 12$a$ and 12$b$, the error-correction coding units 15$a$ and 15$b$, the data modulating units 16$a$ and 16$b$, the subcarrier mapping unit 17, the IFFT unit 18, the CP inserting unit 19, an FFT unit 21, a subcarrier demapping unit 22, a channel-quality measuring unit 23, a scheduler unit 24, and a CP removing unit 29.

The CP removing unit 29 removes a CP from a signal converted into a baseband signal by the wireless processing unit 12a. The FFT unit 21 performs fast Fourier transform on the baseband signal from which the CP has been removed by the CP removing unit 29, thereby transforming the time-domain signal into a frequency-domain signal.

The subcarrier demapping unit 22 separates the signal input from the FFT unit 21 into a data signal, a control-information signal, a pilot signal for channel-quality measurement, and the like. Then, the subcarrier demapping unit 22 inputs the separated pilot signal for channel-quality measurement to the channel-quality measuring unit 23. Incidentally, in FIG. 7, out of the signals into which the signal has been separated by the subcarrier demapping unit 22, only the pilot for channel-quality measurement is illustrated.

The channel-quality measuring unit 23 measures the channel quality on the basis of the pilot signal for channel-quality measurement input from the subcarrier demapping unit 22, and inputs quality information indicating the measured channel quality to the scheduler unit 24. Incidentally, in the same manner as the channel-quality measuring unit 109 described above, the channel-quality measuring unit 23 divides the pilot signal for channel-quality measurement, for example, by a predetermined frequency band, and measures a radio-wave level of each signal divided by frequency band.

The scheduler unit 24 performs a frequency scheduling process on the basis of the channel quality measured by the channel-quality measuring unit 23. Specifically, as illustrated in FIG. 7, the scheduler unit 24 has a domain determining unit 24a and an allocation determining unit 24b.

The domain determining unit 24a determines a possibly-allocated domain, which is a band that may be used in uplink communication with the mobile station 200, with respect to each mobile station. The allocation determining unit 24b allocates a frequency band used in the uplink communication within the possibly-allocated domain determined by the domain determining unit 24a to the mobile station 200 on the basis of the quality information measured by the channel-quality measuring unit 23.

Then, the base station 20 transmits possibly-allocated-domain information 20b determined by the domain determining unit 24a via the error-correction coding unit 15a, the data modulating unit 16a, the subcarrier mapping unit 17, the IFFT unit 18, the CP inserting unit 19, and the wireless processing unit 12b. Specifically, like the example illustrated in FIG. 4, the base station 20 includes the possibly-allocated-domain information 20b in user data, and transmits the user data including the possibly-allocated-domain information 20b to the mobile station 200.

Furthermore, the base station 20 transmits allocation information 20d calculated by the allocation determining unit 24b via the error-correction coding unit 15b, the data modulating unit 16b, the subcarrier mapping unit 17, the IFFT unit 18, the CP inserting unit 19, and the wireless processing unit 12b. Specifically, like the example illustrated in FIG. 4, the base station 20 includes the allocation information 20d in a control signal, and transmits the control signal including the allocation information 20d to the mobile station 200.

Configuration of Mobile Station in Second Embodiment

Figure 8:
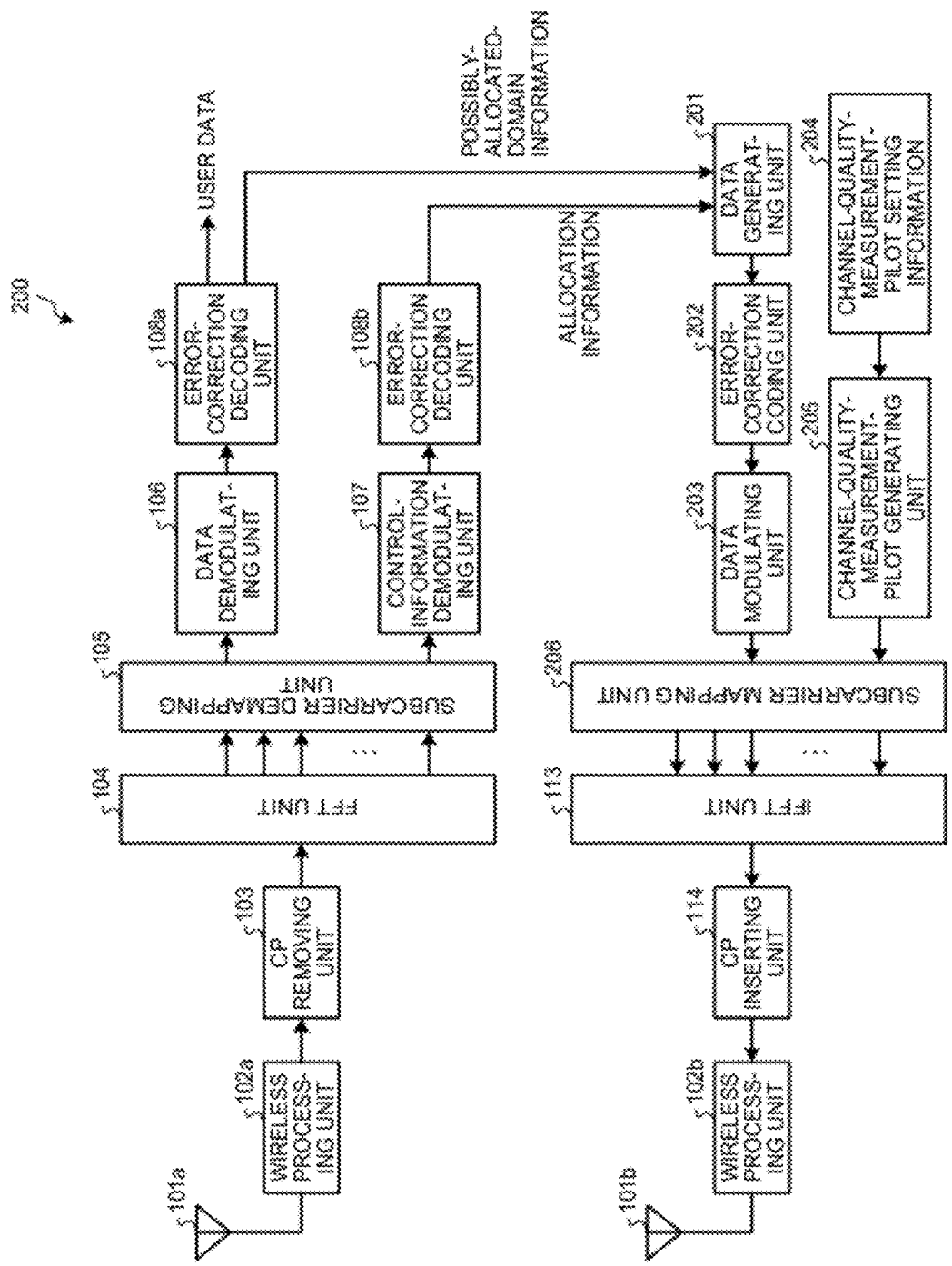
FIG. 8 is a diagram illustrating a configuration example of a mobile station in the second embodiment.

Subsequently, a configuration of the mobile station 200 in the second embodiment is explained with reference to FIG. 8. FIG. 8 is a diagram illustrating a configuration example of the mobile station 200 in the second embodiment. Incidentally, in FIG. 8, processing units involved in uplink communication are mainly illustrated.

In the example illustrated in FIG. 8, the mobile station 200 has the antennas 101a and 101b, the wireless processing units 102a and 102b, the CP removing unit 103, the FFT unit 104, the subcarrier demapping unit 105, the data demodulating unit 106, the control-information demodulating unit 107, the error-correction decoding units 108a and 108b, the IFFT unit 113, the CP inserting unit 114, a data generating unit 201, an error-correction coding unit 202, a data modulating unit 203, channel-quality-measurement-pilot setting information 204, a channel-quality-measurement-pilot generating unit 205, and a subcarrier mapping unit 206.

The error-correction decoding unit 108a performs an error correction on a data signal demodulated by the data demodulating unit 106, and inputs possibly-allocated-domain information included in the data signal to the data generating unit 201. Incidentally, the "possibly-allocated-domain information" here denotes information on a possibly-allocated-domain for uplink determined by the base station 20.

The error-correction decoding unit 108b performs an error correction on a control-information signal demodulated by the control-information demodulating unit 107, and inputs allocation information included in the control-information signal to the data generating unit 201. Incidentally, the "allocation information" here denotes allocation information for uplink determined by the base station 20.

The data generating unit 201 generates data including user data and the like to be transmitted to the base station 20. Specifically, the data generating unit 201 generates data in accordance with the possibly-allocated-domain information input from the error-correction decoding unit 108a and the allocation information input from the error-correction decoding unit 108b.

The error-correction coding unit 202 adds an error correcting code to the data generated by the data generating unit 201. The data modulating unit 203 modulates the data error-correction-coded by the error-correction coding unit 202. Then, the data modulating unit 203 outputs the modulated data to the subcarrier mapping unit 206.

The channel-quality-measurement-pilot setting information 204 holds various information on a pilot for channel-quality measurement. Specifically, the channel-quality-measurement-pilot setting information 204 holds information on a frequency band in which a pilot signal for channel-quality measurement is transmitted, transmission intervals, a pattern of frequency hopping, and the like.

The channel-quality-measurement-pilot generating unit 205 generates a pilot for channel-quality measurement in accordance with the channel-quality-measurement-pilot setting information 204, and outputs the generated pilot for channel-quality measurement to the subcarrier mapping unit 206.

The subcarrier mapping unit 206 maps a modulation symbol of the data input from the data modulating unit 203 and the pilot for channel-quality measurement input from the channel-quality-measurement-pilot generating unit 205 to a subcarrier. Then, the mobile station 200 transmits a signal mapped by the subcarrier mapping unit 206 to the base station 20 via the IFFT unit 113, the CP inserting unit 114, and the wireless processing unit 102b.

Figure 9:
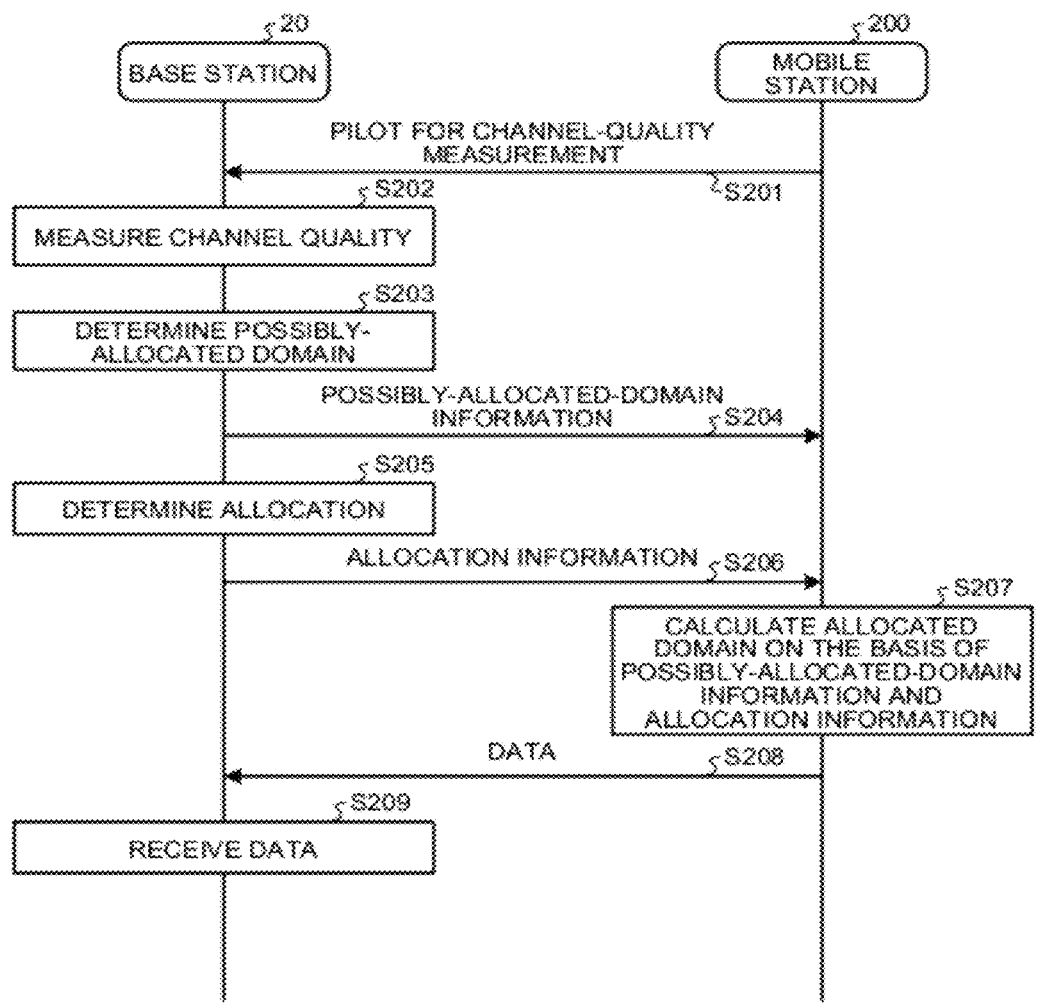
FIG. 9 is a sequence diagram illustrating a procedure of a frequency-band allocating process performed by a communication system according to the second embodiment.

Frequency-Band Allocating Process by Communication System According to Second Embodiment Subsequently, a procedure of a frequency-band allocating process performed by the communication system 2 according to the second embodiment is explained with reference to FIG. 9. FIG. 9 is a sequence diagram illustrating the procedure of the frequency-band allocating process performed by the communication system 2 according to the second embodiment.

As illustrated in FIG. 9, the mobile station 200 transmits a pilot signal for channel-quality measurement to the base station 20 (Step S201). Subsequently, the base station 20 measures the channel quality on the basis of the pilot signal for channel-quality measurement received from the mobile station 200 (Step S202).

Subsequently, the base station 20 determines a possibly-allocated domain which is a band that may be used in communication with the mobile station 200 (Step S203). Then, the base station 20 transmits possibly-allocated-domain information indicating the determined possibly-allocated domain to the mobile station 200 (Step S204).

Subsequently, the base station 20 determines a frequency band to be allocated to the mobile station 200 within the possibly-allocated domain determined at Step S203 on the basis of the channel quality measured at Step S202 (Step S205). Then, the base station 20 transmits allocation information, which is information on the frequency band allocated to the mobile station 200, to the mobile station 200 (Step S206).

Subsequently, the mobile station 200 calculates an allocated domain, which is a frequency domain allocated to the mobile station 200, on the basis of the possibly-allocated-domain information and allocation information received from the base station 20 (Step S207).

After that, the mobile station 200 generates a data signal in accordance with the allocated domain calculated at Step S207, and transmits the generated data signal to the base station 20 (Step S208). Then, the base station 20 receives the data signal transmitted from the mobile station 200 (Step S209).

Although not described above, the base station 20 periodically performs the channel-quality measuring process at Steps S201 and S202 illustrated in FIG. 9. Furthermore, the base station 20 periodically performs the possibly-allocated-domain determining process at Step S203 illustrated in FIG. 9. Moreover, the base station 20 periodically performs the allocation determining process at Steps S205 and S206 illustrated in FIG. 9. Incidentally, the intervals of the possibly-allocated-domain determining process, the intervals of the channel-quality measuring process, and the intervals of the allocation determining process need not be the same intervals. For example, the intervals of the possibly-allocated-domain determining process can be longer than the intervals of the channel-quality measuring process and the intervals of the allocation determining process.

Effect of Second Embodiment

As described above, when uplink communication is performed in the communication system 2 according to the second embodiment, a possibly-allocated domain that may be used in uplink communication is determined with respect to each mobile station, and within the possibly-allocated domain, a frequency band used in the uplink communication is allocated to each mobile station. Therefore, the communication system 2 according to the second embodiment is capable of finely allocating a frequency band to each mobile station when uplink communication is performed.

Incidentally, in the above first and second embodiments, it is preferable that the base stations 10 and 20 divide a possibly-allocated domain allocated with respect to each mobile station by a predetermined fixed number to allocate a frequency band used in communication to each mobile station. Specifically, it is preferable that the base stations 10 and 20 fix the number of bits included in allocation information. By fixing the number of bits included in allocation information in this way, it is possible to prevent the design and processing associated with a control-information channel from being complicated.

Figure 10:
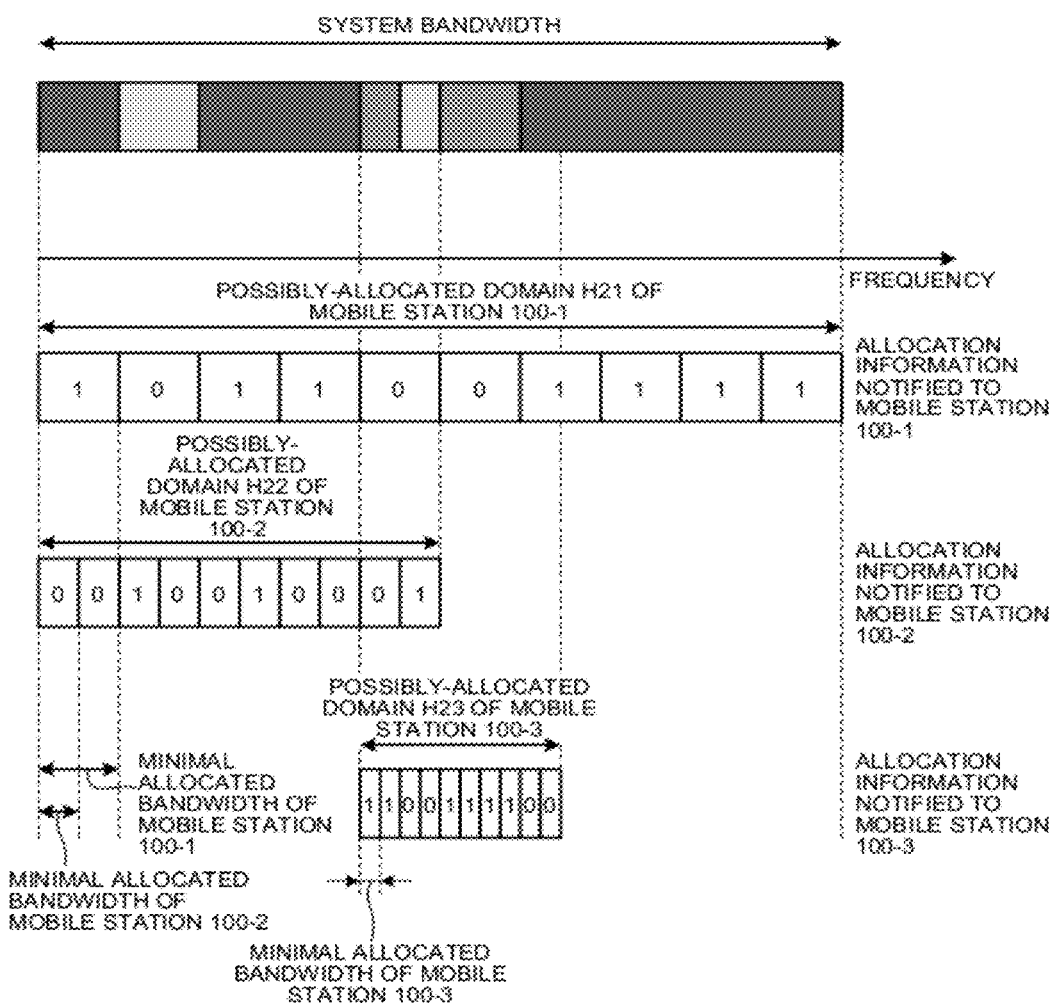
FIG. 10 is a diagram illustrating an example of a frequency scheduling process.

Here we explain it more specifically with reference to FIG. 10. FIG. 10 is a diagram illustrating an example of a frequency scheduling process. Incidentally, in FIG. 10, as an example, there is described the case where the base station 20 performs uplink communication with three mobile stations 100-1 to 100-3. In the example illustrated in FIG. 10, the base station 20 determines to set a possibly-allocated domain H21 as a possibly-allocated domain of the mobile station 100-1, determines to set a possibly-allocated domain H22 as a possibly-allocated domain of the mobile station 100-2, and determines to set a possibly-allocated domain H23 as a possibly-allocated domain of the mobile station 100-3.

Then, the base station 20 divides each of the possibly-allocated domains H21 to H23 into ten, and determines a frequency band to be allocated for the communication from the divided bandwidths. Specifically, the base station 20 varies respective minimal allocated bandwidths by which the possibly-allocated domains H21 to H23 are divided, and divides all the possibly-allocated domains H21 to H23 into ten. In this manner, even if the possibly-allocated domains H21 to H23 differ in size, the base station 20 varies the respective minimal allocated bandwidths and therefore can divide each of the possibly-allocated domains into the fixed number of subdomains. Incidentally, if a possibly-allocated domain may not be equally divided, the base station 20 need not divide the possibly-allocated domain into subdomains of the same size.

Incidentally, in the first embodiment, there is described the case where the present invention is applied to downlink communication; in the second embodiment, there is described the case where the present invention is applied to uplink communication. However, the present invention can also be applied to the case of the both processing described in the first and second embodiments. For example, the base station according to the present invention can have the both configurations of the base station 10 illustrated in FIG. 3 and the base station 20 illustrated in FIG. 7. Furthermore, for example, the mobile station according to the present invention can have the both configurations of the mobile station 100 illustrated in FIG. 5 and the mobile station 200 illustrated in FIG. 8.

[c] Third Embodiment

In the above second embodiment, there is described the example where the base station transmits possibly-allocated-domain information to the mobile station. However, when uplink communication is performed, not let the base station transmit possibly-allocated-domain information to the mobile station, but the mobile station can calculate a possibly-allocated domain. Therefore, in the third embodiment, there is described an example where the mobile station calculates a possibly-allocated domain.

Configuration of Communication System

First, a configuration of a communication system 3 according to the third embodiment is explained. The configuration of the communication system 3 according to the third embodiment is the same as the configuration example of the communication system 1 illustrated in FIG. 1. In the third embodiment, to distinguish the communication system 3 from the communication system 1 according to the first embodiment, the communication system 3 shall have a base station 30 and mobile stations 300-1 to 300-*n*. Incidentally, in the description below, when it is not necessary to specify any of the mobile stations 300-1 to 300-*n*, the mobile stations 300-1 to 300-*n* shall be collectively referred to as the mobile station 300.

In the communication system 3 according to the third embodiment, when uplink communication is performed, the mobile station 300 measures its own moving speed, and determines a possibly-allocated domain to be allocated to the mobile station 300 on the basis of the measured moving speed, and also transmits the measured moving speed to the base station 30. Incidentally, a process of determining the possibly-allocated domain on the basis of the moving speed will be explained later.

Then, the base station 30 determines a possibly-allocated domain to be allocated to the mobile station 300 on the basis of the moving speed received from the mobile station 300. At this time, the mobile station 300 and the base station 30 determine the possibly-allocated domain with the same algorithm. Therefore, the mobile station 300 and the base station 30 can calculate the same possibly-allocated domain.

In this manner, in the communication system 3 according to the third embodiment, the base station 30 and the mobile station 300 both calculate a possibly-allocated domain. Namely, in the communication system 3 according to the third embodiment, without transmission of a possibly-allocated domain from the base station 30 to the mobile station 300, both the base station 30 and the mobile station 300 can obtain the possibly-allocated domain. Therefore, in the communication system 3 according to the third embodiment, it is possible to finely allocate a frequency band to each mobile station while reducing an amount of data transmitted and received between the base station 30 and the mobile station 300.

Configuration of Base Station in Third Embodiment

Figure 11:
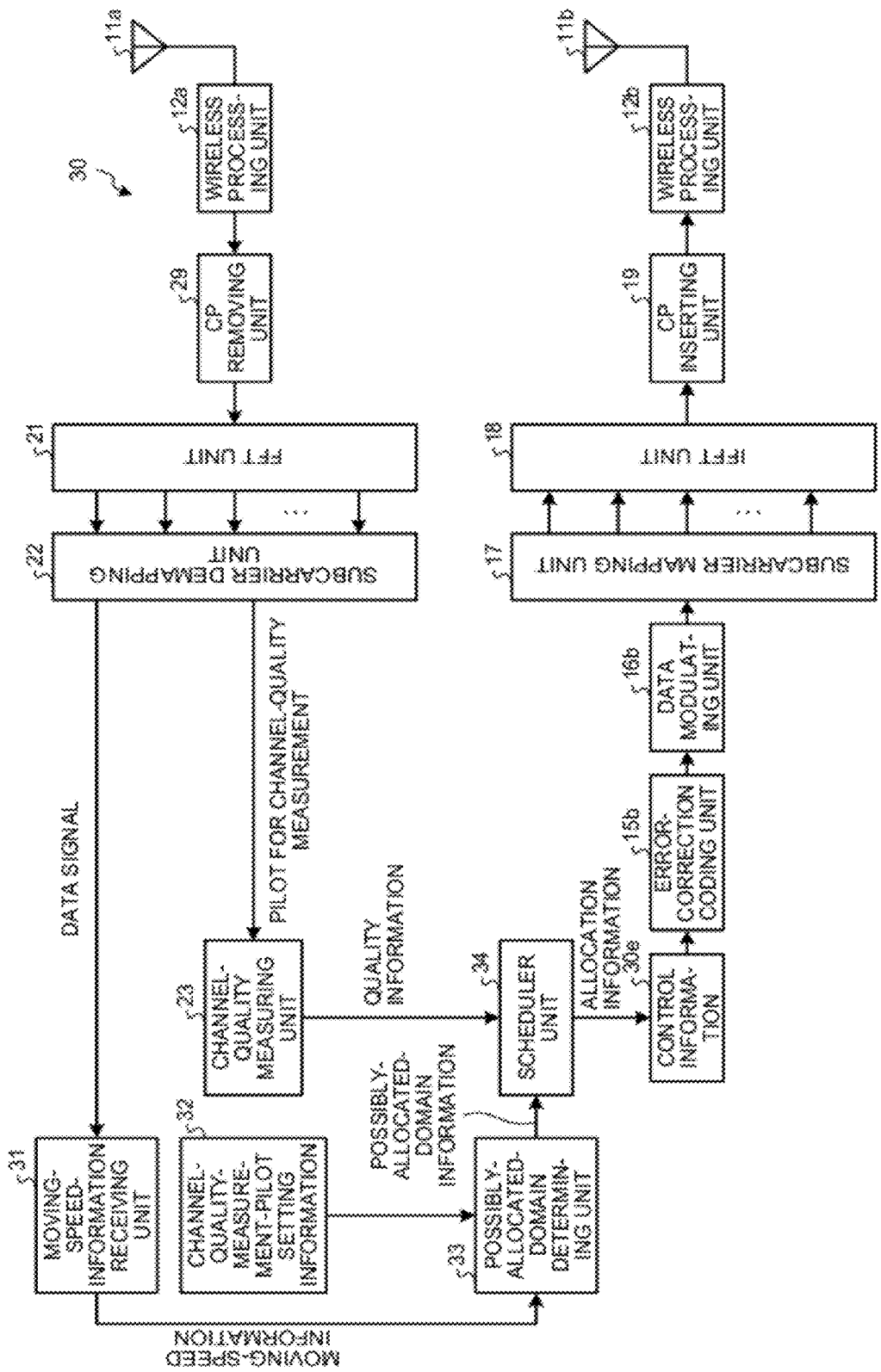
FIG. 11 is a diagram illustrating a configuration example of a base station in a third embodiment.

Subsequently, a configuration of the base station 30 in the third embodiment is explained with reference to FIG. 11. FIG. 11 is a diagram illustrating a configuration example of the base station 30 in the third embodiment. Incidentally, in FIG. 11, processing units involved in uplink communication are mainly illustrated.

In the example illustrated in FIG. 11, the base station 30 has the antennas 11*a* and 11*b*, the wireless processing units 12*a* and 12*b*, the error-correction coding unit 15*b*, the data modulating unit 16*b*, the subcarrier mapping unit 17, the IFFT unit 18, the CP inserting unit 19, the FFT unit 21, the subcarrier demapping unit 22, the channel-quality measuring unit 23, the CP removing unit 29, a moving-speed-information receiving unit 31, channel-quality-measurement-pilot setting information 32, a possibly-allocated-domain determining unit 33, and a scheduler unit 34.

The subcarrier demapping unit 22 separates a signal input from the FFT unit 21 into a data signal, a control-information signal, a pilot for channel-quality measurement, and the like. Then, the subcarrier demapping unit 22 inputs the separated data signal to the moving-speed-information receiving unit 31. Incidentally, in FIG. 11, out of the signals into which the signal has been separated by the subcarrier demapping unit 22, only the data signal is illustrated.

The moving-speed-information receiving unit 31 extracts moving-speed information included in the data signal input from the subcarrier demapping unit 22, and outputs the extracted moving-speed information to the possibly-allocated-domain determining unit 33. Incidentally, the "moving-speed information" here is information transmitted from the mobile station 300 and indicates the moving speed of the mobile station 300.

The channel-quality-measurement-pilot setting information 32 holds various information on a pilot signal for channel-quality measurement transmitted by the mobile station 300. Specifically, in the same manner as the channel-quality-measurement-pilot setting information 204 illustrated in FIG. 8, the channel-quality-measurement-pilot setting information 32 holds information on a frequency band in which a pilot signal for channel-quality measurement is transmitted and the like.

The possibly-allocated-domain determining unit 33 determines a possibly-allocated domain on the basis of the moving-speed information input from the moving-speed-information receiving unit 31 and various information held in the channel-quality-measurement-pilot setting information 32.

Specifically, the possibly-allocated-domain determining unit 33 references a pilot signal for channel-quality measurement previously transmitted by the mobile station 300 on the basis of the channel-quality-measurement-pilot setting information 32. Then, the possibly-allocated-domain determining unit 33 determines to set a frequency band of the referenced pilot signal for channel-quality measurement as a possibly-allocated domain.

At this time, the possibly-allocated-domain determining unit 33 determines a pilot signal for channel-quality measurement to be referenced according to the moving speed of the mobile station 300. Specifically, when the possibly-allocated-domain determining unit 33 refers for a previously-transmitted pilot signal to determine a possibly-allocated domain, the possibly-allocated-domain determining unit 33 determines a period of time to reference (hereinafter, may referred to as a "reference period") out of a period in which pilot signals were transmitted according to the moving speed of the mobile station 300.

For example, the lower the moving speed of the mobile station 300 is, the longer reference period the possibly-allocated-domain determining unit 33 sets; the higher the moving speed of the mobile station 300, the shorter reference period. This is because when the moving speed is high, a change in wireless environment is big, so outdated information is unreliable; however, when the moving speed is low, a change in wireless environment is small, so even outdated information is reliable. Incidentally, a process of determining the possibly-allocated domain will be explained later with an example with reference to FIGS. 13 to 15.

The scheduler unit 34 determines a frequency band to be allocated to the mobile station 300 within the possibly-allocated domain determined by the possibly-allocated-domain determining unit 33 on the basis of the channel quality measured by the channel-quality measuring unit 23.

Then, the base station 30 transmits allocation information calculated by the scheduler unit 34 via the error-correction coding unit 15*b*, the data modulating unit 16*b*, the subcarrier mapping unit 17, the IFFT unit 18, the CP inserting unit 19, and the wireless processing unit 12*b*. Specifically, like the example illustrated in FIG. 4, the base station 30 includes the allocation information in a control signal, and transmits the control signal including the allocation information to the mobile station 300.

Configuration of Mobile Station in Third Embodiment

Subsequently, a configuration of the mobile station 300 in the third embodiment is explained with reference to FIG. 12.

Figure 12:
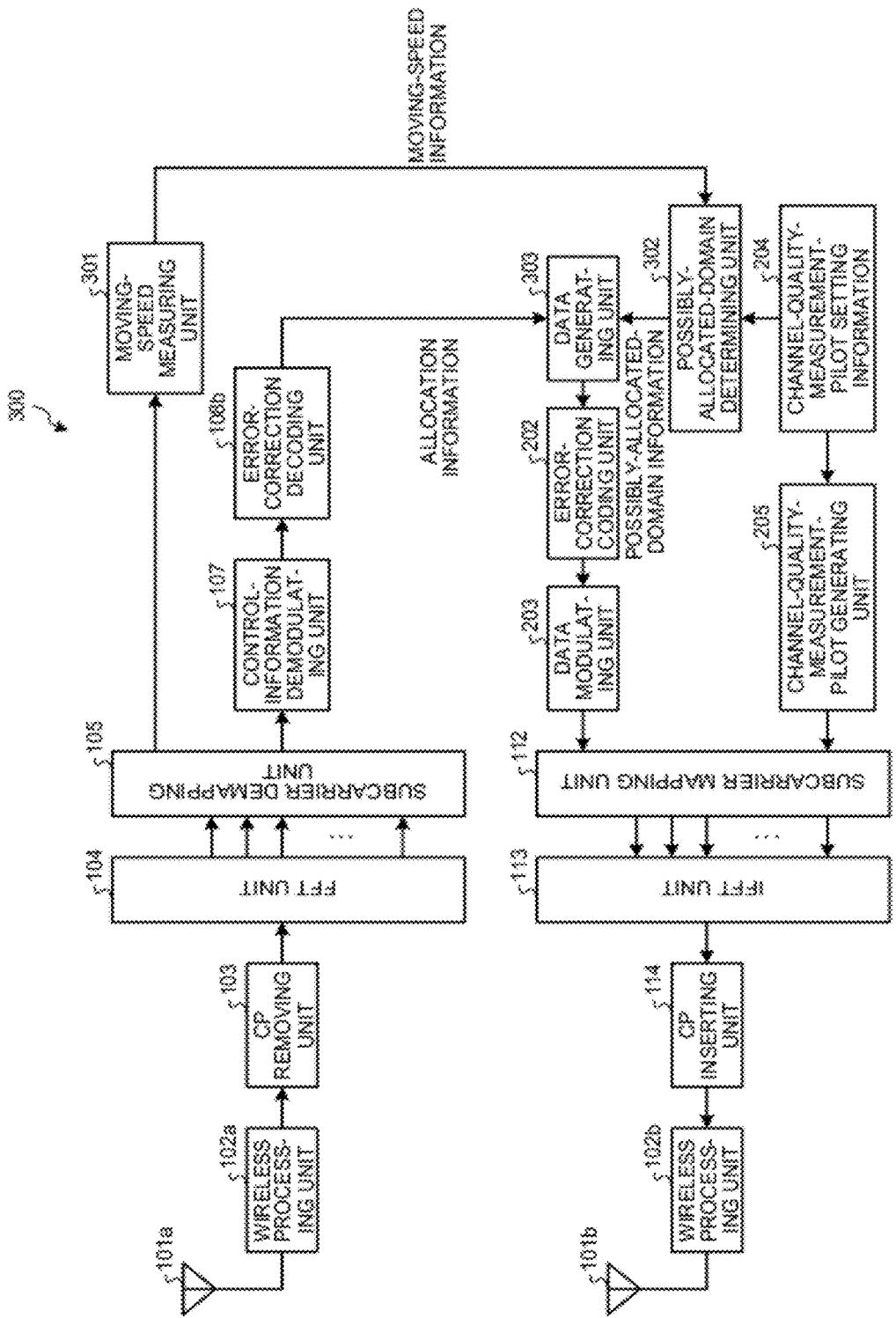
FIG. 12 is a diagram illustrating a configuration example of a mobile station in the third embodiment.

FIG. 12 is a diagram illustrating a configuration example of the mobile station 300 in the third embodiment. Incidentally, in FIG. 12, processing units involved in uplink communication are mainly illustrated.

In the example illustrated in FIG. 12, the mobile station 300 has the antennas 101a and 101b, the wireless processing units 102a and 102b, the CP removing unit 103, the FFT unit 104, the subcarrier demapping unit 105, the control-information demodulating unit 107, the error-correction decoding unit 108b, the IFFT unit 113, the CP inserting unit 114, the error-correction coding unit 202, the data modulating unit 203, the channel-quality-measurement-pilot setting information 204, the channel-quality-measurement-pilot generating unit 205, a moving-speed measuring unit 301, a possibly-allocated-domain determining unit 302, and a data generating unit 303.

The channel-quality-measurement-pilot setting information 204 holds various information on a pilot signal for channel-quality measurement transmitted by the mobile station 300. Incidentally, the channel-quality-measurement-pilot setting information 204 is the same information as the channel-quality-measurement-pilot setting information 32 illustrated in FIG. 11.

The moving-speed measuring unit 301 measures the moving speed of the mobile station 300. For example, the moving-speed measuring unit 301 measures the moving speed of the mobile station 300 on the basis of a change in channel quality of a pilot signal transmitted from the base station 30. Furthermore, for example, the moving-speed measuring unit 301 has a speed sensor or a GPS (Global Positioning System), and measures the moving speed of the mobile station 300 on the basis of a result of measurement by the speed sensor or GPS. Incidentally, a process that the mobile station 300 measures its own moving speed is a well-known technology.

The possibly-allocated-domain determining unit 302 determines a possibly-allocated domain used in communication with the base station 30 on the basis of moving-speed information input from the moving-speed measuring unit 301 and various information held in the channel-quality-measurement-pilot setting information 204. Incidentally, the possibly-allocated-domain determining unit 302 performs a possibly-allocated-domain determining process with the same algorithm as that is used by the possibly-allocated-domain determining unit 33 illustrated in FIG. 11. Namely, the possibly-allocated-domain determining unit 302 changes a pilot signal for channel-quality measurement to be referenced according to the moving speed of the mobile station 300, and determines to set a frequency band of the referenced pilot signal for channel-quality measurement as a possibly-allocated domain.

The data generating unit 303 generates data to be transmitted to the base station 30 on the basis of the possibly-allocated domain determined by the possibly-allocated-domain determining unit 302 and allocation information input from the error-correction decoding unit 108b.

Example of Possibly-Allocated-Domain Determining Process

Subsequently, an example of the possibly-allocated-domain determining process performed by the base station 30 and the mobile station 300 is explained with reference to FIGS. 13 to 15. Incidentally, the possibly-allocated-domain determining process performed by the base station 30 is identical to the possibly-allocated-domain determining process performed by the mobile station 300, so the possibly-allocated-domain determining process performed by the base station 30 is explained below.

Figure 13:
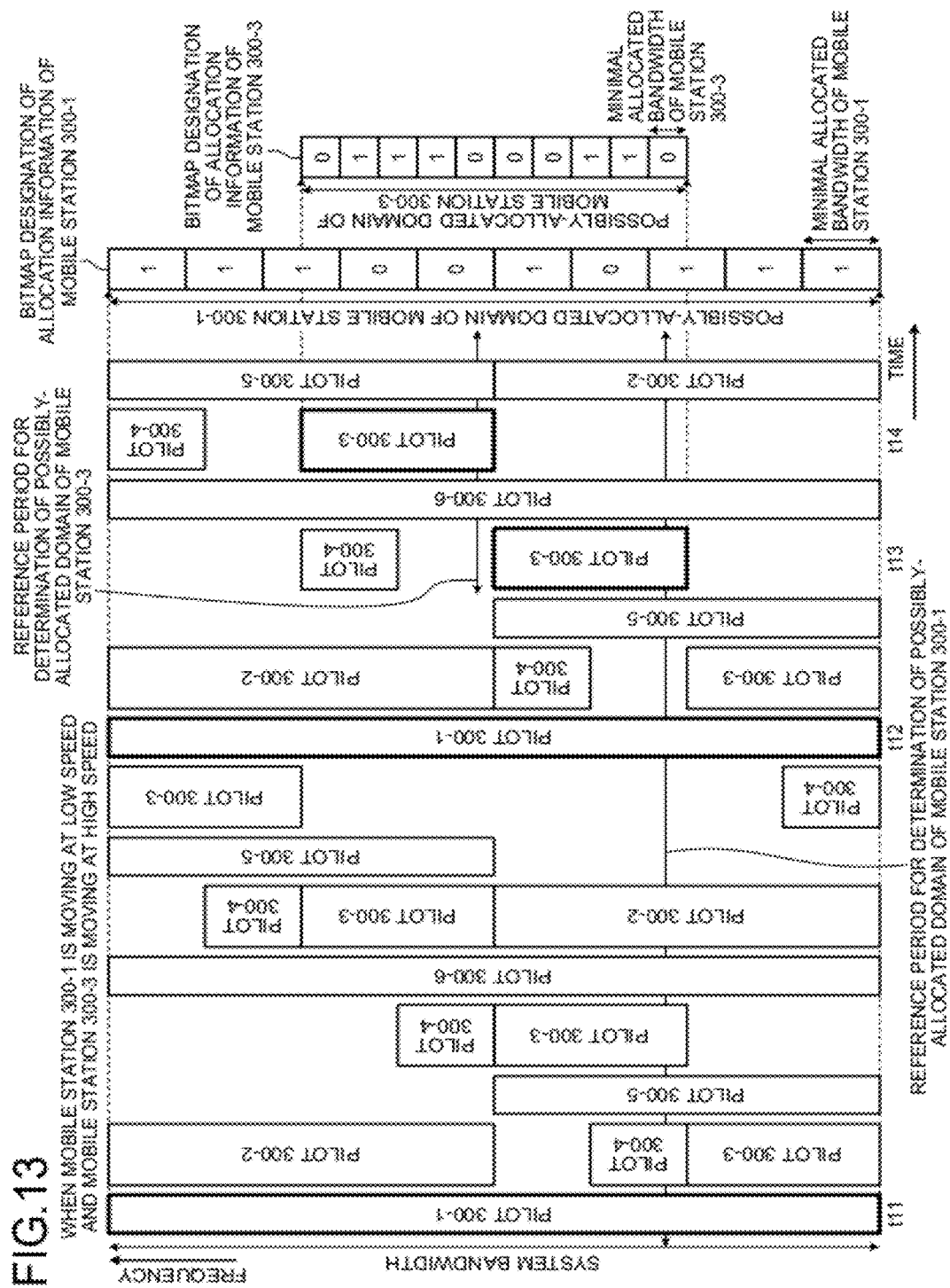
FIG. 13 is a diagram for explaining an example of a possibly-allocated-domain determining process performed by the base station and the mobile station in the third embodiment.
Figure 14:
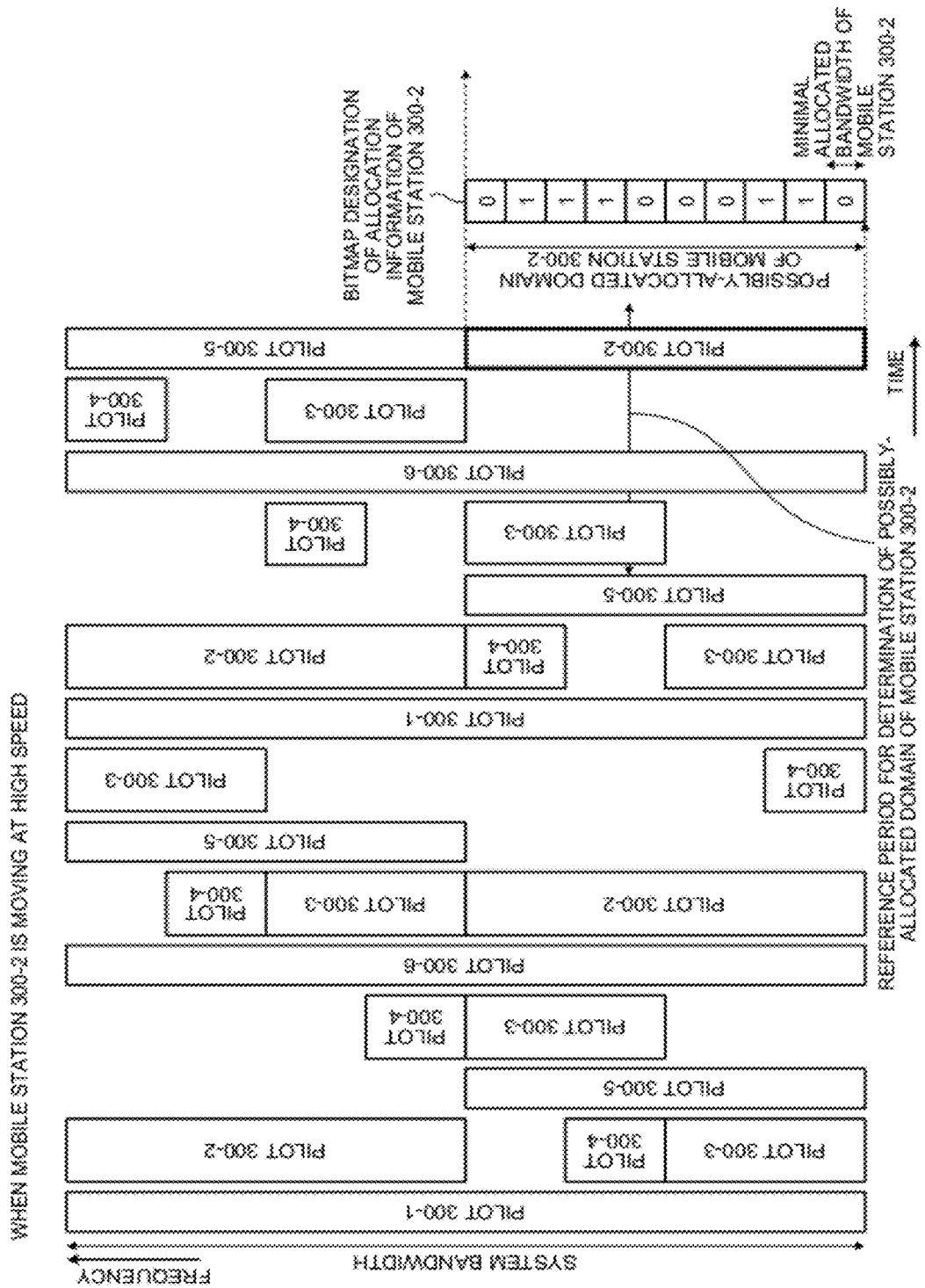
FIG. 14 is a diagram for explaining an example of the possibly-allocated-domain determining process performed by the base station and the mobile station in the third embodiment.
Figure 15:
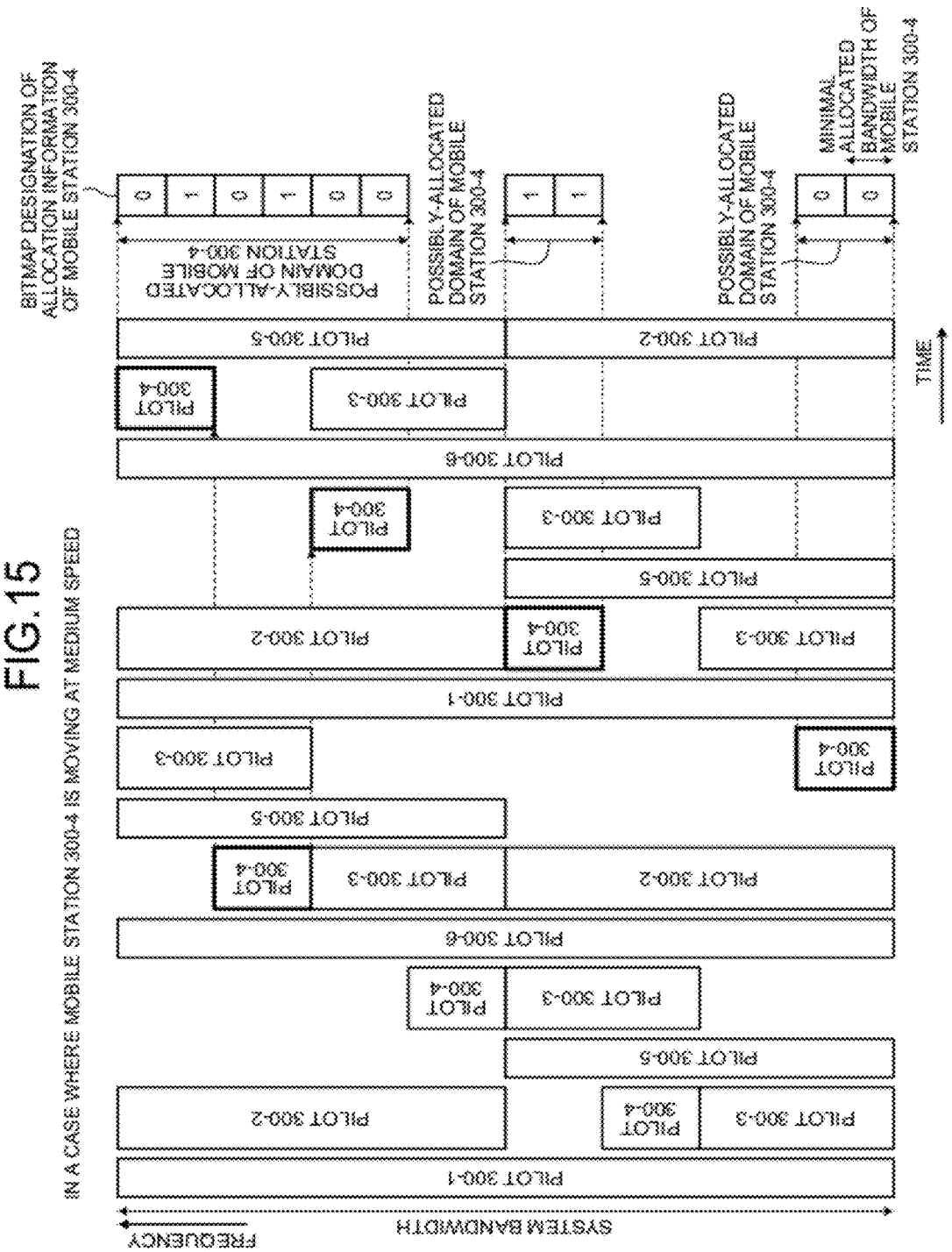
FIG. 15 is a diagram for explaining an example of the possibly-allocated-domain determining process performed by the base station and the mobile station in the third embodiment.

FIGS. 13 to 15 are diagrams for explaining an example of the possibly-allocated-domain determining process performed by the base station 30 and the mobile station 300 in the third embodiment. Incidentally, in FIGS. 13 to 15, pilot signals for channel-quality measurement transmitted from the mobile stations to the base station are illustrated. Furthermore, in FIGS. 13 to 15, the base station 30 shall communicate with six mobile stations 300-1 to 300-6. And, in FIGS. 13 to 15, "PILOT 300-x" illustrates the pilot signal for channel quality measurement transmitted from the mobile station 300-x.

First, in an example illustrated in FIG. 13, the mobile station 300-1 is moving at low speed, and the mobile station 300-3 is moving at high speed. In such a condition, when determining a possibly-allocated domain to be allocated to the mobile station 300-1, the base station 30 references a pilot signal for channel-quality measurement transmitted by the mobile station 300-1. Furthermore, when determining a possibly-allocated domain to be allocated to the mobile station 300-3, the base station 30 references a pilot signal for channel-quality measurement transmitted by the mobile station 300-3.

At this time, like the example illustrated in FIG. 13, the base station 30 sets a reference period for determination of a possibly-allocated domain of the mobile station 300-1 to be longer than a reference period for determination of a possibly-allocated domain of the mobile station 300-3. This is because the mobile station 300-1 is moving at lower speed than the mobile station 300-3.

For example, in the example illustrated in FIG. 13, when determining a possibly-allocated domain of the mobile station 300-1, the base station 30 references a pilot signal transmitted by the mobile station 300-1 during the period from a time t11 until the present time. Specifically, the base station 30 references a pilot signal transmitted at the time t11 and a pilot signal transmitted at a time t12, and sets frequency bands in which the referenced two pilot signals were transmitted as a possibly-allocated domain to be allocated to the mobile station 300-1.

Furthermore, in the example illustrated in FIG. 13, when determining a possibly-allocated domain of the mobile station 300-3, the base station 30 references a pilot signal transmitted by the mobile station 300-3 during the period from a time t13 until the present time. Specifically, the base station 30 references a pilot signal transmitted at the time t13 and a pilot signal transmitted at a time t14, and sets frequency bands in which the referenced two pilot signals were transmitted as a possibly-allocated domain to be allocated to the mobile station 300-3.

In an example illustrated in FIG. 14, the mobile station 300-2 is moving at high speed. In this case, the base station 30 shortens a reference period for determination of a possibly-allocated domain of the mobile station 300-2. In the example illustrated in FIG. 14, the base station 30 references one pilot signal for channel-quality measurement transmitted by the mobile station 300-2. Then, the base station 30 sets a frequency band in which the referenced one pilot signal was transmitted as a possibly-allocated domain to be allocated to the mobile station 300-2.

In an example illustrated in FIG. 15, the mobile station 300-4 is moving at medium speed. In this case, the base station 30 sets a reference period for determination of a possibly-allocated domain of the mobile station 300-4 to be shorter than that is in high-speed movement and longer than that is in low-speed movement. Specifically, in the example illustrated in FIG. 15, the base station 30 references four pilot signals for channel-quality measurement transmitted by the mobile station 300-4. Then, the base station 30 sets frequency bands in which the referenced four pilot signals were transmitted as a possibly-allocated domain to be allocated to the mobile station 300-4. Incidentally, like the example illustrated in FIG. 15, the base station 30 can set discontinuous frequency bands as a possibly-allocated domain.

Figure 16:
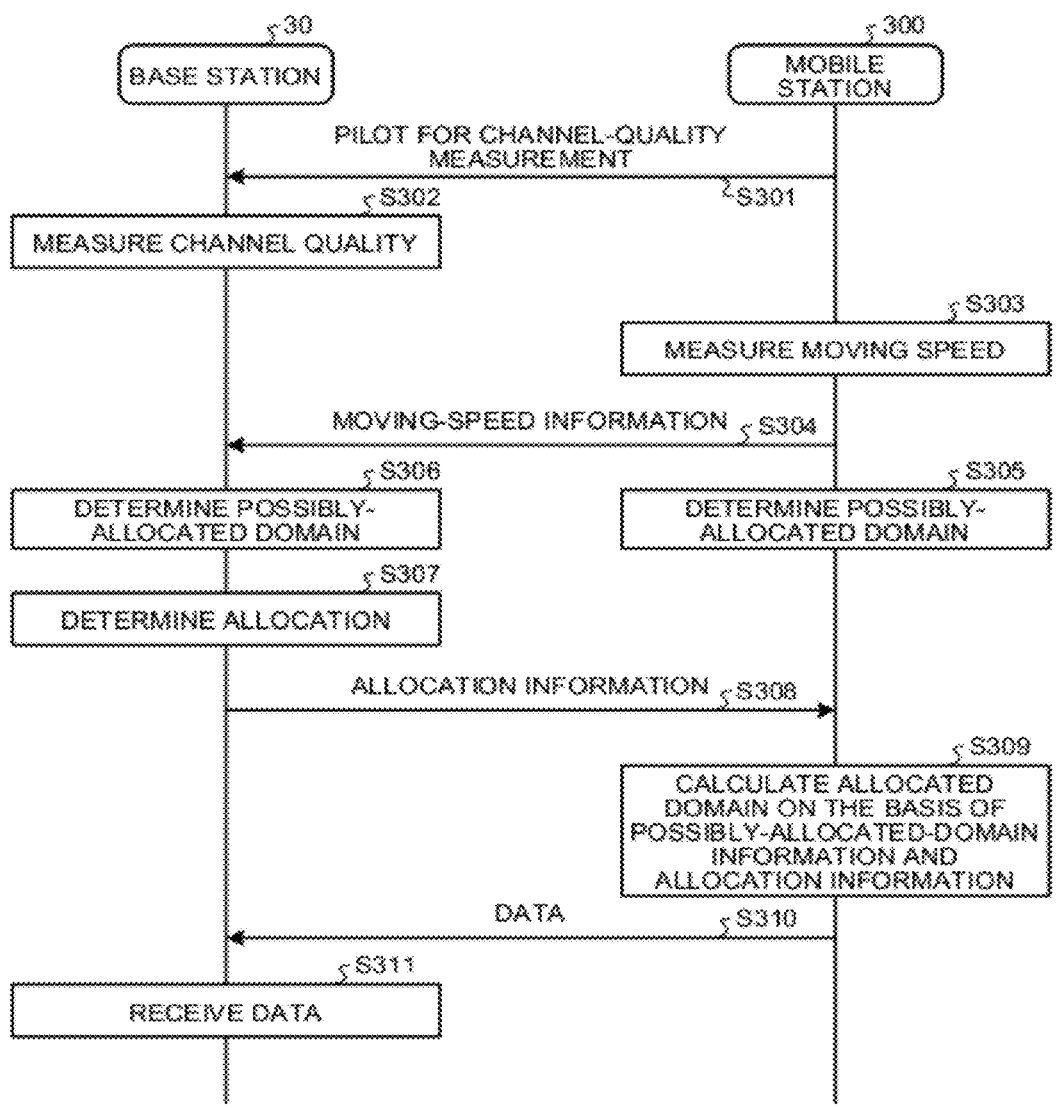
FIG. 16 is a sequence diagram illustrating a procedure of a frequency-band allocating process performed by a communication system according to the third embodiment.

Frequency-Band Allocating Process by Communication System According to Third Embodiment Subsequently, a procedure of a frequency-band allocating process performed by the communication system 3 according to the third embodiment is explained with reference to FIG. 16. FIG. 16 is a sequence diagram illustrating the procedure of the frequency-band allocating process performed by the communication system 3 according to the third embodiment.

As illustrated in FIG. 16, the mobile station 300 transmits a pilot signal for channel-quality measurement to the base station 30 (Step S301). Subsequently, the base station 30 measures the channel quality on the basis of the pilot signal for channel-quality measurement received from the mobile station 300 (Step S302).

Subsequently, the mobile station 300 measures its own moving speed (Step S303). Then, the mobile station 300 transmits moving-speed information indicating the measured moving speed to the base station 30 (Step S304). Furthermore, the mobile station 300 determines a pilot signal for channel-quality measurement to be referenced, and determines to set a frequency band in which the pilot signal to be referenced was transmitted as a possibly-allocated domain (Step S305).

Furthermore, the base station 30 determines a possibly-allocated domain to be allocated to the mobile station 300 with the same algorithm as that is used by the mobile station 300 on the basis of the moving-speed information received from the mobile station 300 (Step S306).

Subsequently, the base station 30 determines a frequency band to be allocated for communication with the mobile station 300 within the possibly-allocated domain determined at Step S306 on the basis of the channel quality measured at Step S302 (Step S307). Then, the base station 30 transmits allocation information, which is information on the frequency band allocated for communication, to the mobile station 300 (Step S308).

Subsequently, the mobile station 300 calculates an allocated domain allocated to the mobile station 300 on the basis of the possibly-allocated domain determined at Step S305 and the allocation information received from the base station 30 (Step S309).

After that, the mobile station 300 generates a data signal in accordance with the allocated domain calculated at Step S309, and transmits the generated data signal to the base station 30 (Step S310). Then, the base station 30 receives the data signal transmitted from the mobile station 300 (Step S311).

Effect of Third Embodiment

As described above, in the communication system 3 according to the third embodiment, the base station 30 and the mobile station 300 both calculate a possibly-allocated domain. Therefore, in the communication system 3 according to the third embodiment, it is possible to narrow a frequency band to be allocated to each mobile station while reducing an amount of data transmitted and received between the base station 30 and the mobile station 300.

[d] Fourth Embodiment

In the above third embodiment, there is described the example where the mobile station measures its own moving speed. However, the base station can measure the moving speed of the mobile station. Therefore, in the fourth embodiment, there is described an example where the base station measures the moving speed of the mobile station.

Configuration of Communication System

First, a configuration of a communication system 4 according to the fourth embodiment is explained. The configuration of the communication system 4 according to the fourth embodiment is the same as the configuration example of the communication system 1 illustrated in FIG. 1. In the fourth embodiment, to distinguish the communication system 4 from the communication system 1 according to the first embodiment, the communication system 4 shall have a base station 40 and mobile stations 400-1 to 400-*n*. Incidentally, in the description below, when it is not necessary to specify any of the mobile stations 400-1 to 400-*n*, the mobile stations 400-1 to 400-*n* shall be collectively referred to as the mobile station 400.

In the communication system 4 according to the fourth embodiment, when uplink communication is performed, the base station 40 measures the moving speed of the mobile station 400. Then, the base station 40 determines a possibly-allocated domain to be allocated to the mobile station 400 on the basis of the measured moving speed, and transmits the measured moving speed to the mobile station 400.

Then, the mobile station 400 determines a possibly-allocated domain to be allocated to its own self on the basis of the moving speed received from the base station 40. At this time, the mobile station 400 and the base station 40 determine the possibly-allocated domain with the same algorithm.

Configuration of Base Station in Fourth Embodiment

Figure 17:
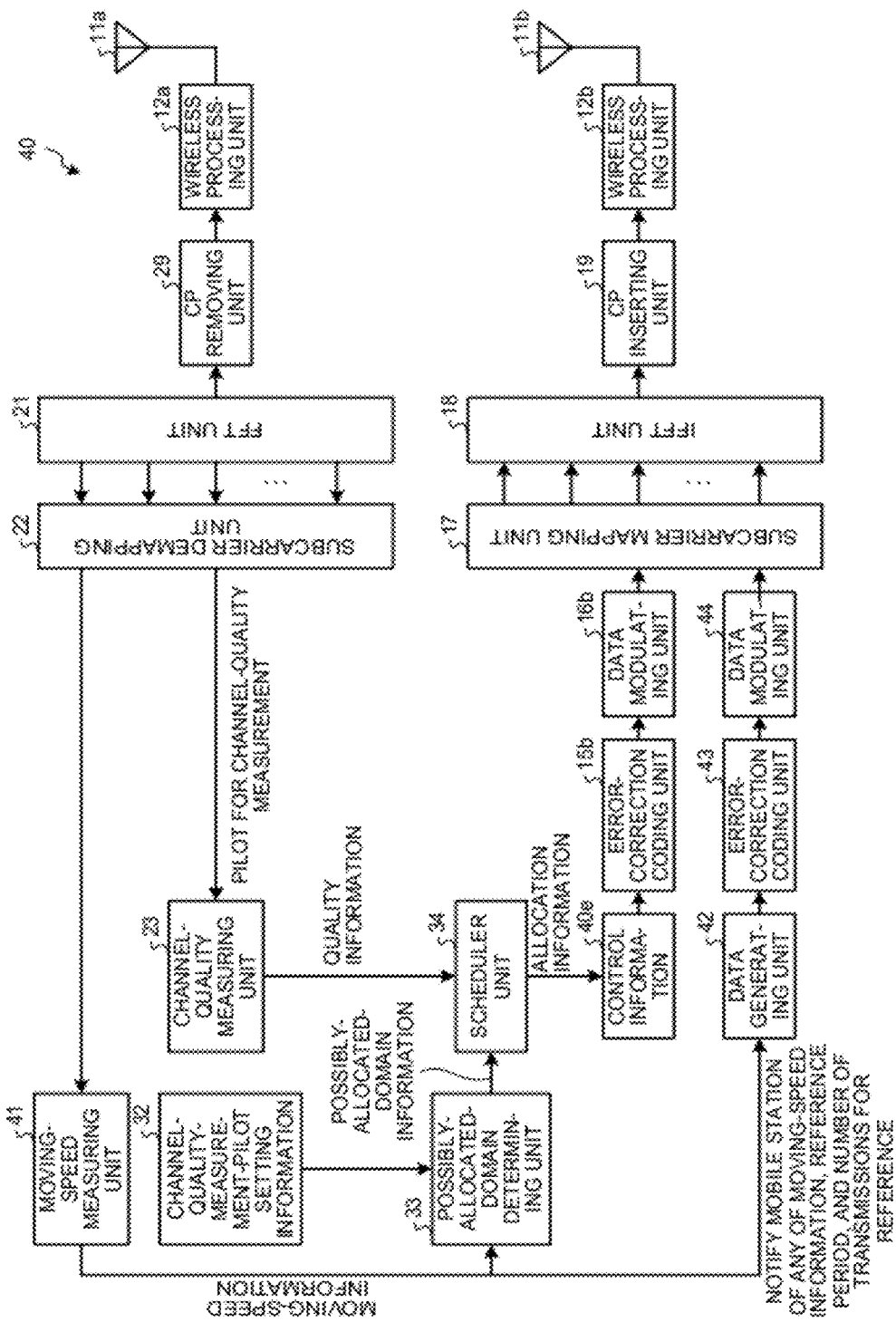
FIG. 17 is a diagram illustrating a configuration example of a base station in a fourth embodiment.

Subsequently, a configuration of the base station 40 in the fourth embodiment is explained with reference to FIG. 17. FIG. 17 is a diagram illustrating a configuration example of the base station 40 in the fourth embodiment. Incidentally, in FIG. 17, processing units involved in uplink communication are mainly illustrated.

In the example illustrated in FIG. 17, the base station 40 has the antennas 11*a* and 11*b*, the wireless processing units 12*a* and 12*b*, the error-correction coding unit 15*b*, the data modulating unit 16*b*, the subcarrier mapping unit 17, the IFFT unit 18, the CP inserting unit 19, the FFT unit 21, the subcarrier demapping unit 22, the channel-quality measuring unit 23, the CP removing unit 29, the channel-quality-measurement-pilot setting information 32, the possibly-allocated-domain determining unit 33, the scheduler unit 34, a moving-speed measuring unit 41, a data generating unit 42, an error-correction coding unit 43, and a data modulating unit 44.

The moving-speed measuring unit 41 measures the moving speed of the mobile station 400, and inputs moving-speed information indicating the measured moving speed to the possibly-allocated-domain determining unit 33 and the data generating unit 42. For example, the moving-speed measuring unit 41 measures the moving speed of the mobile station 400 on the basis of a change in channel quality of a pilot signal transmitted from the mobile station 400. Incidentally, a process that the base station 40 measures the moving speed of the mobile station 400 is a well-known technology.

Incidentally, the moving-speed measuring unit 41 can calculate not the moving speed of the mobile station 400 but a reference period, which is a period in which a pilot signal for channel-quality measurement is referenced, as moving-speed information. This is because even if the moving speed is not known, a possibly-allocated domain can be determined if a reference period is known. Furthermore, the moving-speed measuring unit 41 can calculate not the moving speed of the mobile station 400 but the number of reference to a pilot signal for channel-quality measurement as moving-speed information. This is because when a possibly-allocated domain is determined, how many pilot signals out of previously-transmitted pilot signals for channel-quality measurement is referenced can be used.

The data generating unit 42 generates data including user data to be transmitted to the mobile station 400, the moving-speed information input from the moving-speed measuring unit 41, and the like. The error-correction coding unit 43 adds an error correcting code to the data generated by the data generating unit 42. The data modulating unit 44 modulates the data error-correction-coded by the error-correction coding unit 43.

Then, the data including the moving-speed information is transmitted to the mobile station 400 via the subcarrier mapping unit 17, the IFFT unit 18, the CP inserting unit 19, and the wireless processing unit 12b.

Configuration of Mobile Station in Fourth Embodiment

Figure 18:
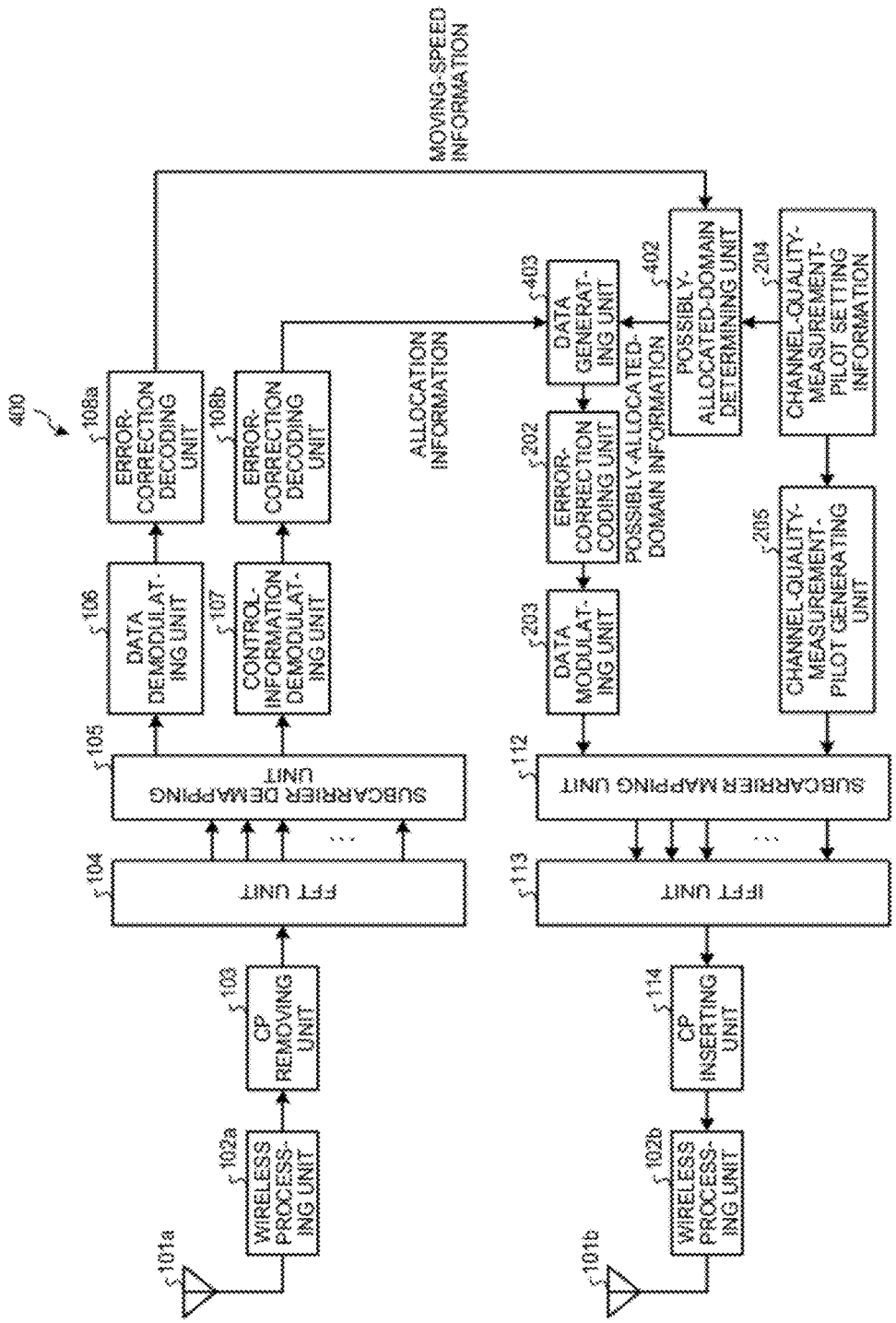
FIG. 18 is a diagram illustrating a configuration example of a mobile station in the fourth embodiment.

Subsequently, a configuration of the mobile station 400 in the fourth embodiment is explained with reference to FIG. 18. FIG. 18 is a diagram illustrating a configuration example of the mobile station 400 in the fourth embodiment. Incidentally, in FIG. 18, processing units involved in uplink communication are mainly illustrated.

In the example illustrated in FIG. 18, the mobile station 400 has the antennas 101a and 101b, the wireless processing units 102a and 102b, the CP removing unit 103, the FFT unit 104, the subcarrier demapping unit 105, the data demodulating unit 106, the control-information demodulating unit 107, the error-correction decoding units 108a and 108b, the IFFT unit 113, the CP inserting unit 114, the error-correction coding unit 202, the data modulating unit 203, the channel-quality-measurement-pilot setting information 204, the channel-quality-measurement-pilot generating unit 205, a possibly-allocated-domain determining unit 402, and a data generating unit 403.

The data demodulating unit 106 demodulates a data signal input from the subcarrier demapping unit 105. The error-correction decoding unit 108a decodes an error correcting code included in the data signal demodulated by the data demodulating unit 106, and performs an error correction. Then, the error-correction decoding unit 108a inputs moving-speed information included in the data signal to the possibly-allocated-domain determining unit 402.

The possibly-allocated-domain determining unit 402 determines a possibly-allocated domain on the basis of the moving-speed information input from the error-correction decoding unit 108a and various information held in the channel-quality-measurement-pilot setting information 204. The data generating unit 403 generates data to be transmitted to the base station 40 on the basis of the possibly-allocated domain determined by the possibly-allocated-domain determining unit 402 and allocation information input from the error-correction decoding unit 108b.

Effect of Fourth Embodiment

As described above, in the communication system 4 according to the fourth embodiment, the base station 40 measures the moving speed of the mobile station 400, and the base station 40 and the mobile station 400 both calculate a possibly-allocated domain. Therefore, in the communication system 4 according to the fourth embodiment, it is possible to narrow a frequency band to be allocated to each mobile station while reducing a load on the mobile station 400.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising a transmitting station and a mobile station, wherein
the transmitting station
determines to set a frequency band of a pilot signal previously transmitted by the mobile station as a possibly-allocated domain, which is a band that may be used in communication with the mobile station;
determines allocation of a frequency band used in the communication with the mobile station within the possibly-allocated domain determined by the transmitting-station on a basis of communication quality with the mobile station; and
transmits allocation information indicating the allocation of the frequency band determined by the transmitting station to the mobile station without ever transmitting possibly-allocated domain information, the possibly-allocated domain information indicating the possibly-allocated domain determined by the transmitting-station, and
the mobile station
receives the allocation information without ever receiving the possibly-allocated domain information;
in accordance with a same determination method as a determination method used by the transmitting-station, determines to set a frequency band of a pilot signal previously transmitted by the mobile station as a possibly-allocated domain, which is a band that may be used in communication with the transmitting station; and
transmits a signal to the transmitting station in accordance with the possibly-allocated domain determined by the mobile-station and the allocation information received by the mobile station, wherein
the transmitting station and the mobile station set a reference period shorter when moving speed of the mobile station is higher, the reference period being a period in which a previously-transmitted pilot signal is referenced, and determine to set, for each mobile station, all frequency bands of all pilot signals to which the transmitting station and the mobile station refer in the reference period as the possibly-allocated domain.

2. A transmitting station that communicates with a mobile station, the transmitting station comprising:
- a processor configured to determine to set a frequency band of a pilot signal previously transmitted by the mobile station as a possibly-allocated domain, which is a band that may be used in communication with the mobile station, and determine allocation of a frequency band used in the communication with the mobile station within the possibly-allocated domain determined by the processor on a basis of communication quality with the mobile station; and
- a transmitting antenna that transmits allocation information indicating the allocation of the allocated frequency band determined by the processor to the mobile station without ever transmitting possibly-allocated domain information indicating the possibly allocated domain determined by the processor, wherein the processor sets a reference period shorter when moving speed of the mobile station is higher, the reference period being a period in which a previously-transmitted pilot signal is referenced, and determines to set, for each mobile station, all frequency bands of all pilot signals to which the processor refers in the reference period as the possibly-allocated domain.

3. A mobile station that communicates with a transmitting station, the mobile station comprising:
- a receiving antenna configured to receive, from the transmitting station, allocation information indicating allocation of a frequency band used in communication with the transmitting station within a possibly-allocated domain without ever receiving possibly-allocated domain information, the possibly-allocated domain information indicating the possibly-allocated domain, the possibly-allocated domain being a band that may be used in the communication with the transmitting station;
- a processor configured to, in accordance with a same determination method as a determination method used by the transmitting station, determine to set a frequency band of a pilot signal previously transmitted by the mobile station as a possibly-allocated domain, which is a band that may be used in communication with the transmitting station; and
- a transmitting antenna that transmits a signal to the transmitting station in accordance with the possibly-allocated domain determined by the processor and the allocation information received by the receiving antenna, wherein the processor sets a reference period shorter when moving speed of the mobile station is higher, the reference period being a period in which a previously-transmitted pilot signal is referenced, and determines to set, for each mobile station, all frequency bands of all pilot signals to which the processor refers in the reference period as the possibly-allocated domain.

* * * * *